(12) United States Patent
Oliaei

(10) Patent No.: US 9,438,300 B1
(45) Date of Patent: Sep. 6, 2016

(54) SENSOR FUSION FOR ANTENNA TUNING

(71) Applicant: INVENSENSE, INC., San Jose, CA (US)

(72) Inventor: Omid Oliaei, Sunnyvale, CA (US)

(73) Assignee: Invensense, Inc., San Jose, CA (US)

( * ) Notice: Subject to any disclaimer, the term of this patent is extended or adjusted under 35 U.S.C. 154(b) by 0 days.

(21) Appl. No.: 14/644,087

(22) Filed: Mar. 10, 2015

(51) Int. Cl.
*H04W 88/00* (2009.01)
*H04B 1/40* (2015.01)
*H04W 72/04* (2009.01)
*H04B 7/12* (2006.01)

(52) U.S. Cl.
CPC .............. *H04B 1/40* (2013.01); *H04W 72/04* (2013.01); *H04B 7/12* (2013.01)

(58) Field of Classification Search
USPC ....... 455/411, 41.2, 412, 517, 404.1, 73, 77, 455/550.1
See application file for complete search history.

(56) References Cited

U.S. PATENT DOCUMENTS

| | | | | |
|---|---|---|---|---|
| 2011/0085525 A1* | 4/2011 | Patini | ..................... | G01D 4/002 370/338 |
| 2012/0148043 A1* | 6/2012 | Tofighbakhsh | ....... | H04L 63/101 380/247 |
| 2013/0325149 A1* | 12/2013 | Manssen | .............. | H04B 1/0458 700/37 |
| 2013/0343584 A1* | 12/2013 | Bennett | ................ | H04R 25/554 381/315 |
| 2015/0257158 A1* | 9/2015 | Jadhav | ..................... | H04B 1/04 455/404.1 |

* cited by examiner

*Primary Examiner* — Ganiyu A Hanidu
(74) *Attorney, Agent, or Firm* — Amin, Turocy & Watson, LLP

(57) ABSTRACT

Sensor fusion for antenna tuning for wireless devices is provided to enhance antenna tuning and reduce power consumption of wireless devices. A sensor management component (SMC) obtains sensor information from sensors associated with a wireless device and determines position and/or orientation of the wireless device in relation to the user, and/or tracks movement of the wireless device. The SMC communicates sensor-based information relating to the position, orientation, and/or movement associated with the wireless device to a tuner management component (TMC) associated with a tuner component and a set of antennas. The TMC determines electrical measurements of the signal from the set of antennas, and determines a tuning setting for the set of antennas based on the sensor-based information and/or the electrical measurements. The TMC provides control information to the tuner component to adjust the tuning of the set of antennas based on the tuning setting.

35 Claims, 14 Drawing Sheets

SENSOR FUSION FOR ANTENNA TUNING

TECHNICAL FIELD

The subject disclosure relates generally to wireless communication technologies, e.g., use of sensor fusion for antenna tuning.

BACKGROUND

Wireless communication devices, such as mobile phones, electronic tablets or pads, and wireless electronic gaming devices, typically include one or more antennas that can be employed to facilitate receiving and transmitting signals (e.g., radio frequency (RF) signals) in the form of electromagnetic waves. Industrial design of consumer wireless communication devices can impose significant limitations on the shape, size, and location of antennas. However, antenna performance can have a significant impact on the overall performance of the wireless communication system. On the one hand, it can be desirable for antennas to receive relatively weak electromagnetic signals and deliver them to an electronic receiver of a wireless communication device without causing further attenuation of the electromagnetic signals. On the other hand, it can be desirable for antennas to receive large electrical signals and convert them to a large electromagnetic wave without introducing significant losses. Any loss mechanism in the antenna causing a reduction in the output power emitted by the wireless communication system can lead to degradation in the RF link, which can be compensated, to some extent, by increasing the power consumption of the system.

The above-described description is merely intended to provide a contextual overview relating to antennas in wireless mobile systems, and is not intended to be exhaustive.

SUMMARY

The following presents a simplified summary of various aspects of the disclosed subject matter in order to provide a basic understanding of some aspects described herein. This summary is not an extensive overview of the disclosed subject matter. It is intended to neither identify key or critical elements of the disclosed subject matter nor delineate the scope of such aspects. Its sole purpose is to present some concepts of the disclosed subject matter in a simplified form as a prelude to the more detailed description that is presented later.

One or more embodiments, such as one or more devices, systems, methods, integrated circuits, and techniques disclosed herein, relate to voice or data communications (e.g., wireless voice or data communications). Disclosed herein is a system comprising a sensor management component that receives sensor information from a set of sensor components associated with a mobile device, wherein the sensor information indicates at least one of a position or an orientation of the mobile device with respect to a user of the mobile device. The system also comprises a tuner management component that determines a tuning setting for a set of antennas of the mobile device, based at least in part on the sensor information, to facilitate tuning the set of antennas.

Also disclosed herein is a wireless device that comprises a sensor hub component that receives sensor data from a set of sensor components associated with the wireless device, wherein the sensor data indicates an interaction with the wireless device by a user. The wireless device also comprises a tuner management component that determines a tuning setting for a set of antennas of the wireless device, based at least in part on the sensor data, to facilitate tuning the set of antennas.

The following description and the annexed drawings set forth in detail certain illustrative aspects of the disclosed subject matter. These aspects are indicative, however, of but a few of the various ways in which the principles of the disclosed subject matter may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
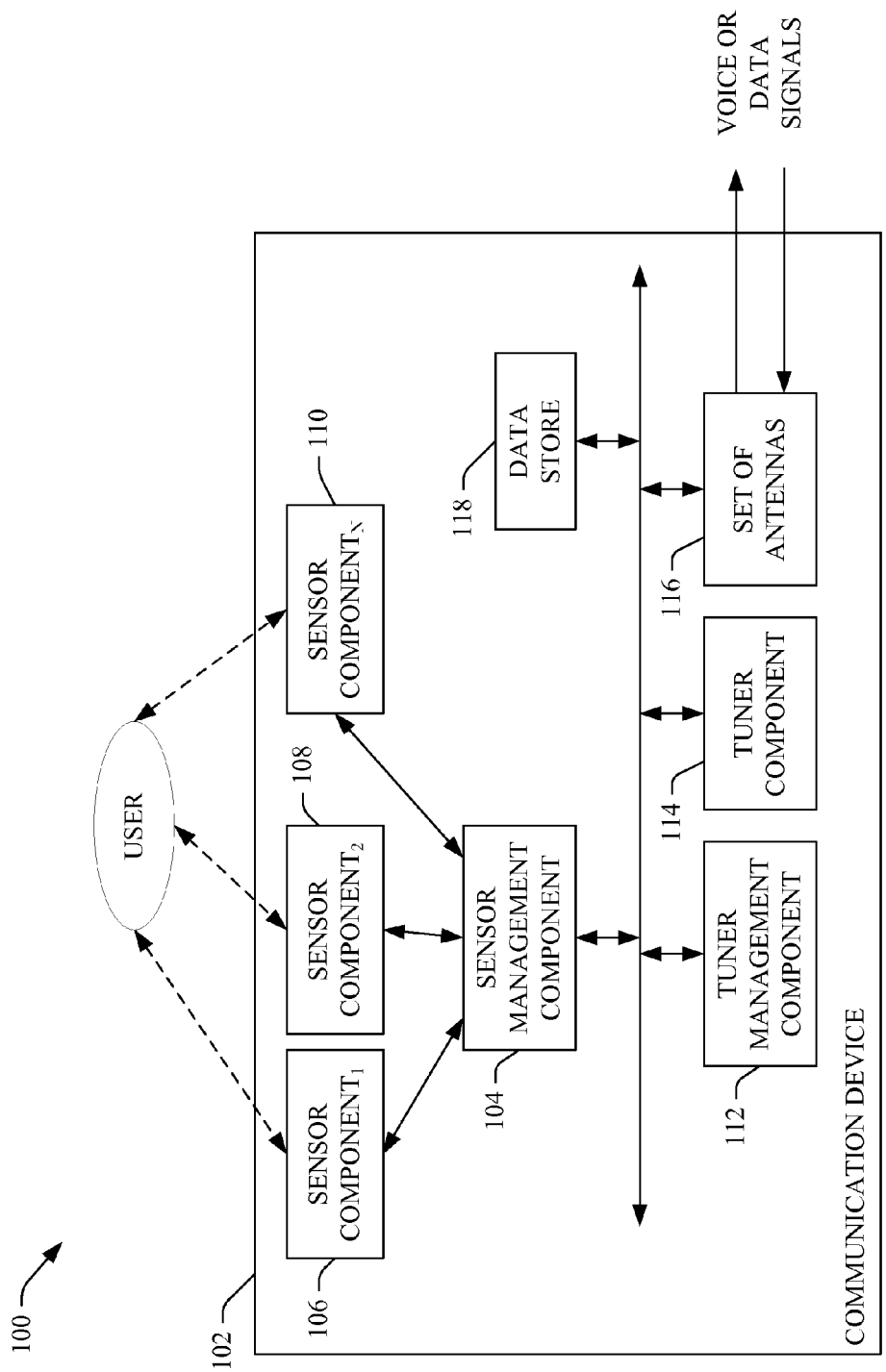
FIG. 1 illustrates a block diagram of an example system that can employ sensor fusion to desirably tune one or more antennas of a communication device, in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

Wireless communication devices, such as mobile phones, electronic tablets or pads, and wireless electronic gaming devices, typically include one or more antennas that can be employed to facilitate receiving and transmitting signals (e.g., radio frequency (RF) signals) in the form of electromagnetic waves. Industrial design of consumer wireless communication devices can impose significant limitations on the shape, size, and location of antennas. However, antenna performance can have a significant impact on the overall performance of the wireless communication system. On the one hand, it can be desirable for antennas to receive relatively weak electromagnetic signals and deliver them to an electronic receiver of a wireless communication device without causing further attenuation of the electromagnetic signals. On the other hand, it can be desirable for antennas to receive large electrical signals and convert them to a large electromagnetic wave without introducing significant losses. Any loss mechanism in the antenna causing a reduction in the output power emitted by the wireless communication system can lead to degradation in the RF link, which can be compensated, to some extent, by increasing the power consumption of the system.

The performance of antennas, or more specifically their insertion loss, may be significantly impacted by the surrounding environment, particularly the body of the user of the wireless communication device. In fact, some of the electromagnetic power generated by the wireless communication device can be absorbed by the human body and therefore, variations in the distance between the wireless communication device and the user can cause significantly large fluctuations in the amount of useful power emitted by the antenna. Some wireless communication systems can be specially designed to operate at a nearly constant power, and it can therefore be desirable that signal power fluctuations be rapidly tracked and compensated using a power control loop.

There are several mechanisms through which the performance of antennas can degrade due to the surrounding environment. These mechanisms mainly boil down to a change in the frequency response of the system through, for example, a shift in the resonant frequency or impedance mismatch. Thus, it can be desirable for wireless communication devices to be able to adaptively compensate for variations in the surrounding environment, particularly for interaction with the body of the user. These techniques, broadly known as antenna tuning, achieve this goal using any one of the three techniques of antenna switching, frequency tuning or impedance matching. Traditionally, all of these techniques include three building blocks. The first building block is a measurement system that can monitor the output power of the transmitter. This measurement system can be radio coupled to the antenna, for example. The second building block can be an adaptation algorithm which can determine the new settings for the antenna tuner or antenna switches based on the measurements performed using the radio. The third building block can be antenna tuners or antenna switches that can change the characteristics of the antenna based on the settings determined by the antenna tuning algorithm. The radio in the antenna tuning system usually can include an RF transceiver coupled to the antenna and a baseband chip where the antenna tuning algorithm can be executed. Alternatively, the antenna tuning algorithm, or part of it, can be implemented in the RF transceiver or the antenna tuner itself.

Conventional antenna-tuning systems typically rely only on electrical measurements fed into an antenna tuning search algorithm which can adaptively change the settings of the antenna tuner or switches. The conventional antenna tuning search algorithm has to determine an optimum tuning setting for the antenna tuner among thousands or millions of possible tuning settings. This can result in large power consumption and a long convergence time to determine the optimum tuning setting. Also, while the conventional antenna tuning search algorithm is attempting to converge to the optimum tuning setting, the output power of the transmitter of the wireless communication device may fluctuate by significantly large amounts. To avoid excessive power fluctuation, a conventional antenna tuning search algorithm may use smaller steps, and thus, may further lengthen the convergence time to determine the optimum tuning setting. A large convergence time can translate into a longer amount of time that the transmitter is operating under sub-optimal conditions. In addition, the antenna tuning system may have to adjust the antenna tuner/switches settings again if the user of the wireless communication device changes the position of the device with respect to the user's body. This setting adjustment, to respond to the change in position of the device with respect to the user's body, may have to occur even before the conventional antenna tuning search algorithm was even able to determine the optimum tuning setting with regard to the prior position of the device with respect to the user's body.

To that end, systems, methods, devices, and techniques for sensor fusion for antenna tuning for wireless devices are provided to enhance antenna tuning and reduce power consumption of wireless devices. A sensor management component can obtain sensor information from a set of sensors (e.g., proximity sensor, audio sensor (e.g., microphone), visual sensor (e.g., camera), light sensor, temperature sensor, accelerometer, gyroscope, etc.), associated with a wireless device. The sensor management component can determine the position and/or orientation of the wireless device in relation to the user based at least in part on the sensor information obtained from the set of sensors. The sensor management component also can track the movement of the wireless device based at least in part on the sensor information obtained from the set of sensors.

The sensor management component can communicate sensor-based information relating to (e.g., indicating) the position and/or orientation of the wireless device in relation to the user, and/or the movement associated with the wireless device to a tuner management component that can be associated with a tuner component and a set of antennas. The tuner management component can determine a tuning setting for the set of antennas based at least in part on the sensor-based information. In some implementations, the tuner management component also can determine electrical measurements of the signal from the set of antennas, and can determine a tuning setting for the set of antennas based at least in part on the sensor-based information and the electrical measurements. The tuner management component can provide control information to the tuner component to adjust the tuning of the set of antennas based at least in part on the tuning setting determined by the tuner management component.

These and other aspects of the disclosed subject matter are described with regard to the figures.

Turning to FIG. 1, illustrated is a block diagram of an example system 100 that can employ sensor fusion to desirably tune one or more antennas of a communication device, in accordance with various aspects and embodiments of the disclosed subject matter. The system 100 can be or can comprise an antenna tuning system that can facilitate efficiently tuning one or more antennas to facilitate wireless communication of information. The system 100 can comprise a communication device 102 (e.g., a wireless communication device) that can transmit and receive voice signals and data signals. For instance, the communication device 102 can transmit voice or data signals to, and/or receive voice or data signals from, another communication device (not shown). The communication device 102 can be or can comprise, for example, a mobile phone (e.g., cellular phone, smart phone, other type of wireless phone), a computer (e.g., laptop computer), a television, a set-top box, an electronic tablet or pad, a personal digital assistant (PDA), a microphone system (e.g., a wireless microphone and base unit), a wireless monitoring system (e.g., in-ear monitoring device and base unit), an electronic gaming device, a router, a two-way radio device, a global positioning system (GPS) device, a radio, electronic glasses (e.g., wireless electronic glasses having communication and computing functionality), a radio frequency identification (RFID) device, or other type of wireless device.

The communication device 102 can comprise a sensor management component 104 and a set of sensor components, comprising sensor component$_1$ 106, sensor component$_2$ 108, up through sensor component$_N$ 110, that can be associated with (e.g., connected to) the sensor management component 104. The set of sensor components (e.g., 106, 108, and/or 110) can be or can comprise one or more sensors that can monitor, sense, or detect various types of conditions associated with the communication device 102. The set of sensor components (e.g., 106, 108, and/or 110) can be or can comprise, for example, a proximity sensor, an audio sensor (e.g., microphone), a visual sensor (e.g., camera), a light sensor (e.g., an ambient light sensor), a temperature sensor (e.g., an ambient light sensor), an accelerometer, a gyroscope, a touch sensor, a humidity sensor, an external component sensor, a function sensor, a biometric sensor, or other type of sensor.

The proximity sensor can sense the proximity of the user with respect to the communication device 102, for example. The audio sensor (e.g., one or more microphones) can sense or receive audio signals (e.g., the user's voice or other noises in proximity to the communication device 102). The audio sensor can be employed by the sensor management component 104 to identify the user of the communication device 102 (e.g., by using voice analysis techniques or algorithms) and/or for sound source localization (e.g., determining the location of a sound source, such as the user's voice or other sound)) with respect to the communication device 102 to facilitate determining the relative orientation and/or position of the communication device 102 with respect to the user's head or other part of the user's body. The visual sensor can sense or detect visual information (e.g., visual images or objects (e.g., user's head or hand) in proximity to the communication device 102. The light sensor can sense lighting conditions in proximity to the communication device 102. The temperature sensor (e.g., an ambient temperature sensor) can sense and/or measure the temperature in proximity to the communication device 102, and the humidity sensor can sense and/or measure humidity in proximity to the communication device 102, wherein, for example, the temperature sensor and humidity sensor can be used to accurately determine the speed of sound, which can be desirable (e.g., usable, necessary) for sound source localization. The accelerometer can sense and measure proper acceleration of the communication device 102 to facilitate determining orientation of the communication device 102 and/or movement or acceleration of the communication device 102. The gyroscope can sense and measure orientation of the communication device 102. The touch sensor can detect, determine, and/or facilitate determining whether the user is touching the communication device 102, what part(s) (e.g., display screen, side or back of the casing of the communication device 102), and/or what part(s) (e.g., finger(s), ear, face) of the user's body is touching the communication device 102. Information relating to touching of the communication device 102 by the user can be used, for example, to determine the type and/or location of the grip the user has on the communication device 102, the proximity of the user's head to the communication device 102 (e.g., the user's ear is touching the device 102 near the speaker of the device 102), as the user's grip on the device 102 and the proximity of the user's head to the device 102 can have a significant effect on performance of the set of antennas of the device 102. The external component sensor can sense, for example, whether an earbud and/or a microphone cord is plugged into an interface of the communication device 102 or whether an earbud and/or a microphone is wirelessly connected to the communication device 102. The function sensor can sense, for example, whether a communication device function, such as a speakerphone function, is being used by the user. The biometric sensor can sense biometric information (e.g., fingerprint information relating to a fingerprint of the user, eye (e.g., retina, iris) information relating to the eye of the user, etc.).

The system 100 also can comprise a tuner management component 112, a tuner component 114, and a set of antennas 116, wherein the tuner management component 112 can be associated with (e.g., connected to) the sensor management component 104 and the tuner component 114. The tuner component 114 can be associated with (e.g., connected to) the set of antennas 116, which can comprise one or more antennas that can be employed to receive or transmit signals (e.g., voice or data signals) being communicated between the communication device 102 and another communication device (not shown).

In some implementations, the system 100 can comprise an open-loop antenna tuning system that can employ sensor fusion that enables the tuning management component 112 to use sensor-related information, based at least in part on sensor information obtained from the set of sensors (e.g., 106, 108, and/or 110) by the sensor management component 104, to enhance performing antenna tuning operations to facilitate efficiently determining a desirable (e.g., optimal, suitable, acceptable) tuning setting (e.g., antenna tuning setting) to employ to tune (e.g., adjust the tuning of) the set of antennas 116 to facilitate desirable transmitting and/or receiving of voice or data signals by the communication device 102, in accordance with defined antenna tuning criteria and a defined antenna tuning algorithm, which can comprise a defined search algorithm.

One or more sensor components (e.g., 106, 108, and/or 110) can sense conditions associated with the communication device 102, including sensing the interactions of the communication device user with the communication device 102. The sensor management component 104 can receive sensor information from the one or more sensor components (e.g., 106, 108, and/or 110), wherein the sensor information can relate to (e.g., can indicate) the conditions associated with the communication device 102, including the interactions of the communication device user with the communication device 102.

The sensor management component 104 can analyze the sensor information to facilitate determining or identifying the conditions associated with the communication device 102. Based at least in part on the results of the analysis of the sensor information, the sensor management component 104 can determine, for example, an orientation of the communication device 102 in relation to the user (e.g., the communication device 102 is oriented substantially vertical with respect to the ground (e.g., due to the communication device 102 being held close to the user's head while the user is standing up), the communication device 102 is oriented substantially horizontal with respect to the ground (e.g., due to the communication device 102 being held in the user's hand substantially parallel to the ground while the user is using an application and viewing the display screen of the communication device 102)), a position (e.g., location) of the user in relation to the communication device 102 (e.g., the distance the communication device 102 is away from the user's body, what part of the body (e.g., head, finger(s), hand) is in proximity to the communication device 102), and/or movement of the communication device 102 (e.g., by tracking movement of the communication device 102 as the user is walking or driving). In some implementations, additionally or alternatively, based at least in part on the results of the analysis of the sensor information, the sensor management component 104 can determine whether the user has plugged earbuds (or headphones) and/or a microphone into an interface (e.g., a microphone/headphone jack) on the communication device 102, whether earbuds and/or a microphone are wirelessly connected (e.g., via Bluetooth or other wireless technology) to the communication device 102, whether a speakerphone function of the communication device 102 is being used, whether the user is engaging in voice communications (e.g., phone call) or data communications (e.g., sending a text multimedia message, using an application for a social networking site), and/or the identity of the user (e.g., using voice analysis, other biometric analysis (e.g., fingerprint analysis, eye analysis), or other type of analysis).

Based at least in part on such analysis results and determinations, the sensor management component 104 can generate sensor-based information that can indicate the orientation and/or position of the communication device 102 with respect to the user, the movement of the communication device 102, whether wired or wireless earbuds or microphone are being used with the communication device 102, whether the speakerphone function is being used on the communication device 102, whether the user is engaging in voice communications or data communications, the identity of the user, and/or other conditions or characteristics associated with the communication device 102 and the user's interactions with the communication device 102. The sensor management component 104 can communicate the sensor-based information to the tuner management component 112.

The tuner management component 112 can analyze the sensor-based information, and/or can apply the defined antenna tuning algorithm, which can comprise the defined search algorithm, to facilitate determining a desirable (e.g., optimal, suitable, acceptable) tuning setting to employ with regard to the set of antennas 116 to facilitate desirable transmission or reception of voice or data signals.

When employing the defined search algorithm, the determination of the orientation and/or position of the communication device 102 in relation to the user, and/or the tracking of the movement of the communication device, by the tuner management component 112 can steer the search to a shorter path to deriving the desirable tuning setting to be used to set or adjust the set of antennas 116, which can shorten the convergence time to determine the desirable tuning setting and reduce power consumption by the communication device 102, can avoid local optima associated with the defined search algorithm (e.g., tuning search algorithm), and/or can otherwise enhance the operation and performance of the communication device 102. In some implementations, the tuner management component 112 can utilize a defined search algorithm to search a set of tuning settings to determine a desirable tuning setting to employ to tune the set of antennas 116 based at least in part on the sensor-based information. The tuner management component 112 can determine a desirable search initialization point associated with an initial tuning setting, based at least in part on the sensor-based information, wherein, due to using the sensor-based information to determine the desirable search initialization point, the desirable search initialization point can be closer to the desirable tuning setting (e.g., to the search point associated with the desirable tuning setting) than search initialization points (e.g., default search initialization points) derived, or randomly or arbitrarily selected, in conventional antenna tuning systems that search for the tuning setting based only on electrical measurements relating to the transmitted or received signal. For instance, the tuner management component 112 can exclude a subset of the set of search points associated with tuning settings (e.g., exclude a subset of the set of tuning settings) from the search and start the search at the desirable search initialization point, based at least in part on the sensor-based information, which can reduce the amount of time used by the tuner management component 112 to complete the search for and determine the desirable tuning setting. The tuner management component 112 can continue the search, as desired (e.g., as needed), to search other search points (e.g., other tuning settings) until the tuner management component 112 identifies the desirable tuning setting, in accordance with the defined search algorithm and defined antenna tuning criteria.

In certain implementations, the tuner management component 112 can store the desirable tuning setting for a given set of conditions (e.g., orientation and/or position of the communication device 102 with respect to the user, movement of the communication device, holding grip on the communication device 102 by the user, user identity, electrical measurements of the received or transmitted signal, and/or other conditions) in a data store 118. For instance, with regard to all or at least some tuning settings determined by the tuner management component 112, the tuner management component 112 can associate the desirable tuning setting with (e.g., link or map the desirable tuning setting to) the given set of conditions that have been determined (e.g., by the sensor management component 104 or tuner management component 112) in connection with determining the desirable tuning setting. The tuner management component 112 can store information relating to the association of the desirable tuning setting with the given set of conditions in the data store 118.

In certain implementations, the tuner management component 112 also can determine, infer, interpolate, and/or extrapolate one or more other tuning settings (e.g., desirable tuning settings) for one or more other sets of conditions (e.g., another set of conditions for which a tuning setting has not yet been determined and associated therewith) based at least in part on the results of an analysis of the desirable tuning setting and associated set of conditions or an analysis of respective desirable tuning settings and their respectively associated sets of conditions. For example, the tuner management component 112 can analyze a first tuning setting associated with a first set of conditions and a second tuning setting associated with a second set of conditions, and, based at least in part on the results of the analysis, can interpolate or extrapolate a third tuning setting, in accordance with the defined antenna tuning criteria. Such determined, inferred, interpolated, and/or extrapolated tuning settings can be associated with their respective sets of conditions, and information relating to the associations between such determined, inferred, interpolated, and/or extrapolated tuning settings and their respective sets of conditions can be stored in the data store 118.

At a future time, when the tuner management component 112 is performing antenna tuning, the tuner management component 112 and/or the sensor management component 104 can determine the current set of conditions associated with the communication device 102. The tuner management component 112 can access the data store 118 and can reference (e.g., look up) or search the various associations of respective desirable tuning settings with respective sets of conditions to determine whether the current set of conditions matches or at least substantially matches a particular set of conditions associated with the communication device 102 that is stored in the data store 118. If the tuner management component 112 determines that the current set of conditions matches or substantially matches the particular set of conditions stored in the data store 118, the tuner management component 112 can determine or identify the particular tuning setting that is associated with the particular set of conditions based at least in part on the association information (e.g., link information, mapping information) stored in the data store 118. In response to determining or identifying the particular tuning setting, the tuner management component 112 can determine that the particular tuning setting is the desirable (e.g., optimal, suitable, acceptable) tuning setting to be employed to tune the set of antennas 116; or, for example, in an instance where the current set of conditions substantially matches the particular set of conditions, but does not satisfy a defined threshold level of matching to permit the particular tuning setting to be determined to be the desirable tuning setting, the tuner management component 112 can determine that the particular tuning setting is to be the desirable search initialization point to use to search for the desirable tuning setting, in accordance with the defined antenna tuning criteria.

The tuner management component 112 or other component also can use, generate or update a model that can characterize respective interactions between the communication device 102 and a user's body for respective orientations and/or positions of the communication device 102 in relation to the user's body in connection with respective tuning settings. The tuner management component 112 can store the model in the data store 118. The model can be generated or updated (e.g., by the tuner management component 112 or another component) based at least in part on simulations of operation of the communication device 102 for respective interactions between the communication device 102 and the user's body for respective orientations and/or positions of the communication device 102 in relation to the user's body, experimental measurements or results relating to operation of the communication device 102 for respective interactions between the communication device 102 and the user's body (or an analogous body) for respective orientations and/or positions of the communication device 102 in relation to the user's body, or adaptive training. For instance, with regard to adaptive training, the tuner management component 112 or another component can adapt or update the model to refine the model based at least in part on information relating to respective interactions between the communication device 102 and a user's body for respective orientations and/or positions of the communication device 102 in relation to the user's body (e.g., in connection with respective tuning settings) that the tuner management component 112 receives or identifies during operation of the communication device 102. In some implementations, the sensor management component 104 can use biometric (e.g., voice, fingerprint, eye) recognition or identification techniques or algorithms to identify a particular user of the communication device 102, wherein the tuner management component 112 (or another component) can generate or update the model (or at least some portions of the model) such that, when using the model to determine a desirable tuning setting(s) for the set of antennas 116, in connection with that particular user using the device 102, the tuner management component 112 can apply the model, or portion thereof, and a desirable tuning setting(s) that can correspond that that particular user. The tuner management component 112 can use the model to initialize the defined search algorithm (e.g., determine a defined search initialization point at which to begin the defined search algorithm) or to facilitate accelerating the search to more quickly determine the desirable tuning setting (e.g., as compared to conventional antenna tuning systems).

With the desirable tuning setting being determined, the tuner management component 112 can generate control information that can correspond to the desirable tuning setting to facilitate setting or adjusting the set of antennas 116 to the desirable tuning setting. The desirable tuning setting can relate to, for example, adjusting a frequency response, resonant frequency, or impedance (e.g., for impedance matching) of one or more antennas of the set of antennas 116, or switching from one antenna to another antenna. The antenna tuning or switching can be used for, and the desirable tuning setting can be determined by the tuner management component 112 and used for, transmitting and/or receiving signals by the communication device 102, at the same time or at different times.

The tuner management component 112 can communicate the control information to the tuner component 114. The tuner component 114 can set or adjust the tuning of one or more antennas of the set of antennas 116 based at least in part on the control information to desirably (e.g., optimally, suitably, acceptably) tune the one or more antennas to facilitate desired reception or transmission of voice or data signals by the communication device 102. In some implementations, the tuner component 114 can comprise variable capacitors, capacitor arrays, or microelectromechanical systems (MEMS) capacitors that can be used to adjust the frequency response, resonant frequency, or impedance of the one or more antennas of the set of antennas 116. With regard to antenna switching in connection with antenna tuning, if the set of antennas 116 comprise more than one antenna, the tuner component 114 can use switches or other components to facilitate switching between antennas or selection of respective antennas to facilitate tuning the set of antennas 116 based at least in part on the desirable tuning setting (e.g., based at least in part on the determined position and/or orientation of the communication device 102 in relation to the user).

Figure 2:
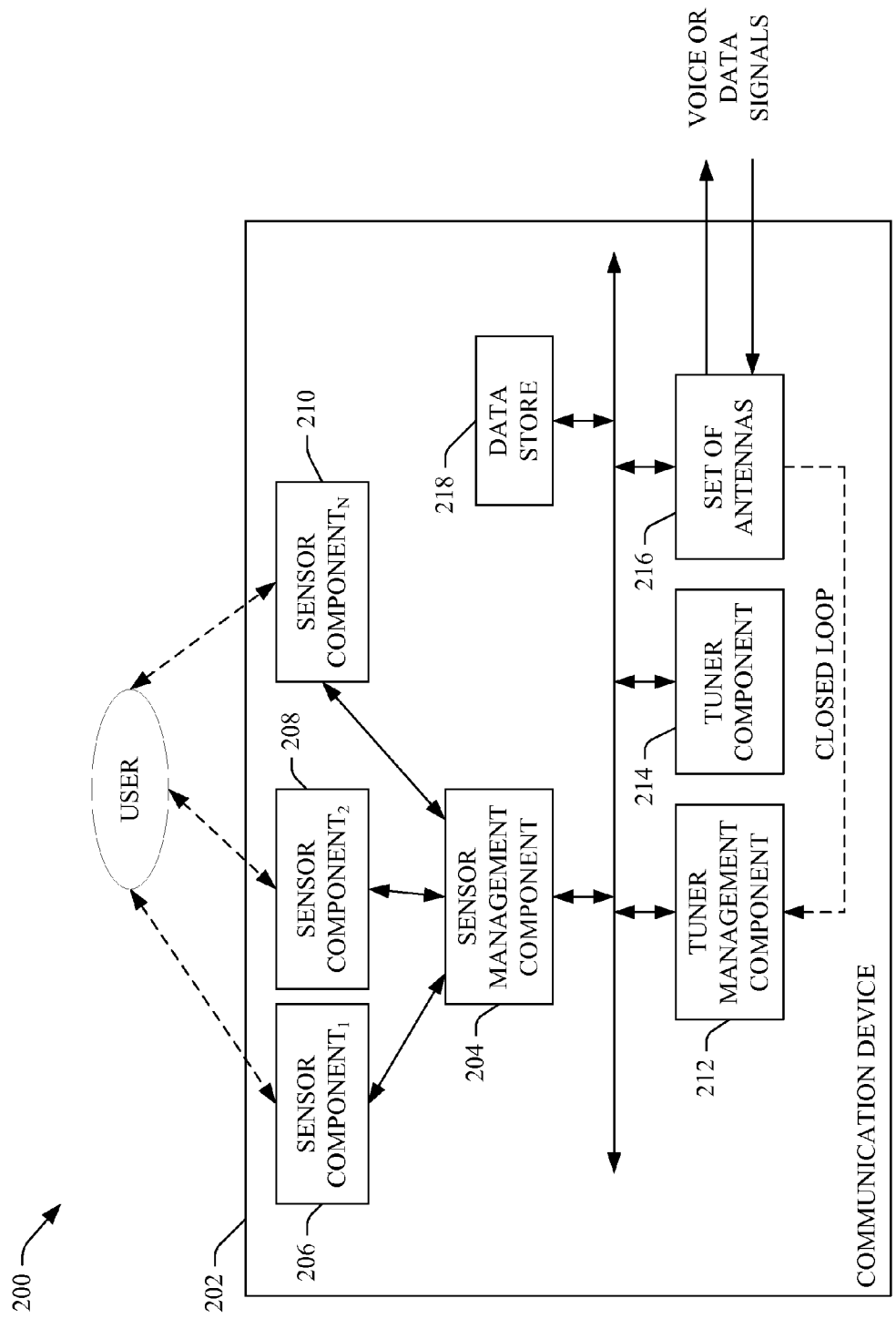
FIG. 2 depicts a block diagram of an example system that can employ sensor fusion, combining the use of sensor information and electrical measurements relating to a signal to desirably tune one or more antennas of a communication device, in accordance with various aspects and embodiments of the disclosed subject matter.

FIG. 2 depicts a block diagram of an example system 200 that can employ sensor fusion, combining the use of sensor information and electrical measurements relating to a signal to desirably tune one or more antennas of a communication device, in accordance with various aspects and embodiments of the disclosed subject matter. The system 200 can comprise a communication device 202, sensor management component 204, a set of sensor components, comprising sensor component₁ 206, sensor component₂ 208, up through sensor component$_N$ 210, tuner management component 212, tuner component 214, a set of antennas 216, and data store 218, that, respectively, can be the same as or similar to, and/or can comprise the same or similar features or functionalities as, respective components (e.g., respectively named components), as more fully disclosed herein. In some implementations, the system 200 can employ closed-loop antenna tuning to facilitate desirably tuning the set of antennas 216.

The sensor management component 204 can receive the sensor information from the set of sensors (e.g., 206, 208, and/or 210), as more fully disclosed herein. The sensor management component 204 can analyze and process the sensor information to determine conditions associated with the communication device 202 in relation to the user (e.g., orientation and/or position of the communication device 202 with respect to the user, movement of the device 202, identity of the user, user's grip on the device 202, and/or other conditions), and can generate sensor-based information based at least in part on the results of the analysis of the sensor information, as more fully disclosed herein. The sensor management component 204 can transmit the sensor-based information relating to the conditions to the tuner management component 212.

The tuner management component 212 can receive the sensor-based information. In some implementations (e.g., closed-loop implementations), the tuner management component 212 can be associated with the set of antennas 216 to monitor and track the characteristics or conditions associated with the signals being received and/or transmitted by the communication device 202 via the set of antennas 216. For instance, the tuner management component 212 can measure and/or determine electrical characteristics relating to signals being received or transmitted by the set of antennas, and can generate electrical measurement information relating to such electrical characteristics of such signals.

The tuner management component 212 can employ sensor fusion to utilize both the sensor-based information and the electrical measurement information relating to the signals to determine the desirable (e.g., optimal, suitable, acceptable) tuning setting to use to set or adjust the tuning of the set of antennas 216, in accordance with a defined antenna tuning algorithm, which can comprise a defined search algorithm, and defined antenna tuning criteria. The tuner management component 212 can analyze the sensor-based information and the electrical measurement information relating to the signals to determine a desirable (e.g., optimal, suitable, acceptable) search initialization point (e.g., associated with an initial tuning setting) that can accelerate the search for the desirable tuning setting (e.g., at the end search point of the search). This can initialize the search for the desirable tuning setting at a particular search point (e.g., the desirable search initialization point) that can be near or at least substantially closer to the end search point (e.g., convergence point or optimum point) that is associated with the desirable tuning setting, as compared to conventional antenna tuning systems, which can shorten the convergence time to determine the desirable tuning setting, as compared to conventional antenna tuning systems, and/or can facilitate (e.g., enable) avoidance of local optima associated with the defined search algorithm. Further, based at least in part on the results of the analysis, the tuner management component 212 can efficiently determine the desirable tuning setting for use to set or adjust the set of antennas 216, in accordance with the defined search algorithm and the defined antenna tuning criteria.

The tuner management component 212, sensor management component 204, or another component also can use the electrical measurement information with the sensor-based information to generate or update a model that can characterize respective interactions between the communication device 202 and a user's body for respective orientations and/or positions of the communication device 202 in relation to the user's body, along with respective electrical measurements relating to signals received or transmitted by the set of antennas 216, in connection with respective tuning settings. The tuner management component 212 can apply the model, which can be stored in and retrieved from the data store 218, to facilitate determining a desirable tuning setting, as more fully disclosed herein.

As disclosed herein, the sensor management component 204 can determine a set of conditions associated with the communication device 202 based at least in part on the sensor information received from the set of sensor components (e.g., 206, 208, and/or 210). The tuner management component 212 can incorporate information relating to the electrical characteristics or measurements relating to the received or transmitted signals as a condition(s) of the set of conditions. The tuner management component 212 can determine the desirable search initialization point associated with the initial tuning setting used for search and/or the desirable tuning setting to use to tune the set of antennas 216, based at least in part on the set of conditions associated with the communication device 202, wherein the set of conditions can be determined based at least in part on the sensor information (e.g., sensor-based information) and the information relating to the electrical measurements or characteristics relating to the signals.

With the desirable tuning setting being determined, the tuner management component 212 can generate control information that can correspond to the desirable tuning setting to facilitate setting or adjusting the set of antennas 216 to the desirable tuning setting. The tuner management component 212 can communicate the control information to the tuner component 214. The tuner component 214 can set or adjust the tuning of one or more antennas of the set of antennas 216 based at least in part on the control information to desirably (e.g., optimally, suitably, acceptably) tune the one or more antennas to facilitate desired reception or transmission of voice or data signals by the communication device 202.

Figure 3:
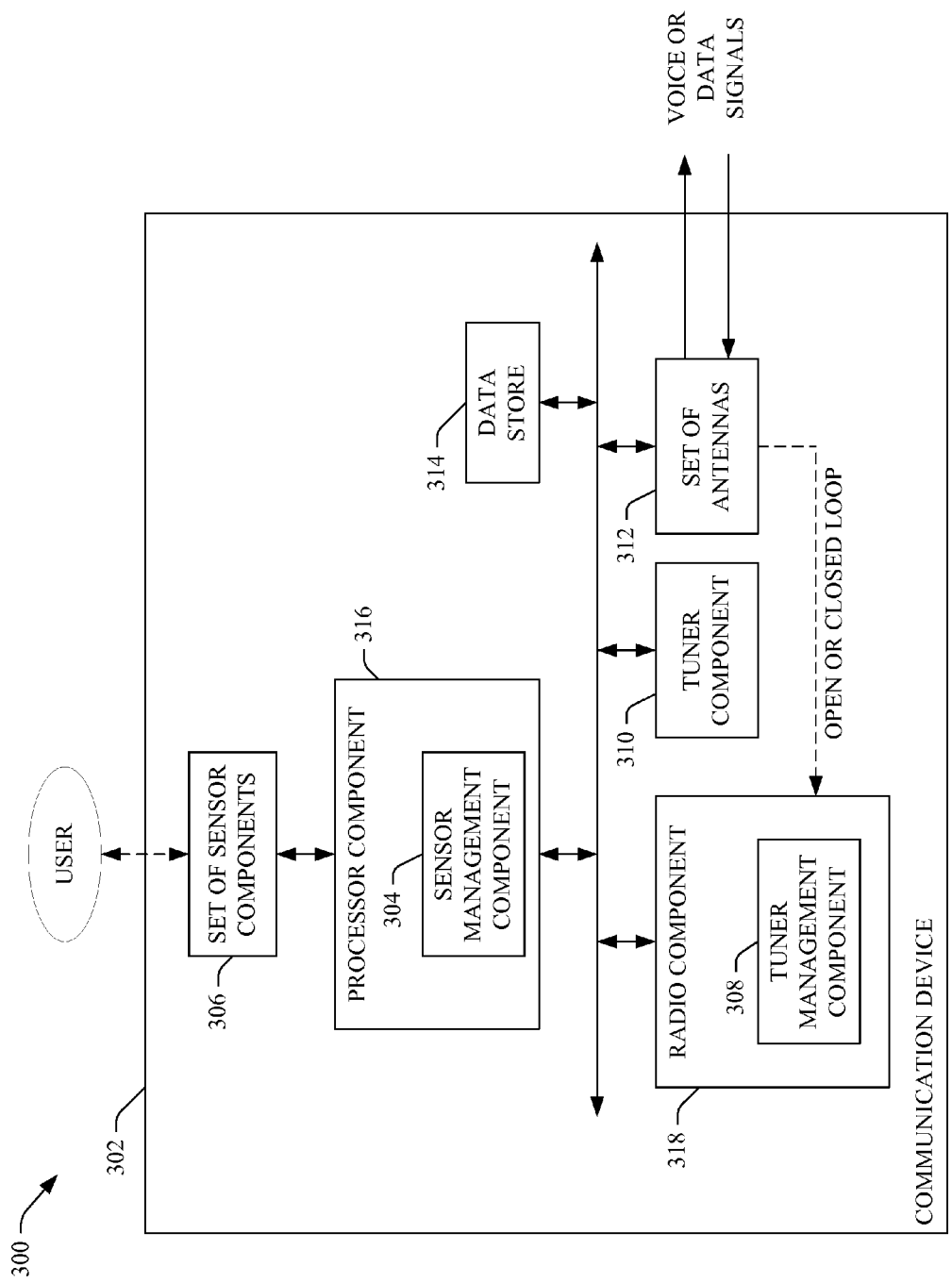
FIG. 3 presents a block diagram of an example system of employing a main processor that can perform sensor fusion to facilitate combining the use of sensor information and electrical measurements relating to a signal to desirably tune one or more antennas of a communication device, in accordance with various aspects and embodiments of the disclosed subject matter.

FIG. 3 presents a block diagram of an example system 300 of employing a main processor that can perform sensor fusion to facilitate combining the use of sensor information and electrical measurements relating to a signal to desirably tune one or more antennas of a communication device, in accordance with various aspects and embodiments of the disclosed subject matter. The system 300 can comprise a communication device 302, sensor management component 304, a set of sensor components 306, tuner management component 308, tuner component 310, a set of antennas 312, and data store 314, that, respectively, can be the same as or similar to, and/or can comprise the same or similar features or functionalities as, respective components (e.g., respectively named components), as more fully disclosed herein. In accordance with various implementations, the system 300 can employ closed-loop antenna tuning or open-loop antenna tuning to facilitate desirably tuning the set of antennas 312.

The communication device 300 can comprise a processor component 316 that can comprise a main processor that can perform sensor fusion using sensor information received from the set of sensor components 306 to provide sensor-based information relating to conditions associated with the communication device 302 (e.g., orientation and/or position of the device 302 in relation to the user, and/or movement of the device 302, etc.), which have been determined by the sensor management component 304, to the tuner management component 308. The main processor of the processor component 316 can comprise or be associated with the sensor management component 304 to facilitate enabling the main processor to receive sensor information from the set of sensor components 306, determine conditions associated with the communication device 302, and/or provide sensor-based information to the tuner management component 308 for further use in determining the desirable tuning setting to apply to the set of antennas 312.

The communication device 300 also can comprise a radio component 318 that can be associated with (e.g., communicatively connected to) the processor component 316. The radio component 318 also can be associated with the tuner component 310 and the set of antennas 312. The radio component 318 can comprise the tuner management component 308, wherein the radio component 318 (and tuner management component 308) can monitor, measure, and/or determine electrical characteristics relating to the signal being received or transmitted by the set of antennas 312. The radio component 318 (and tuner management component 308) also can receive sensor-based information from the processor component 316. The radio component 318 can employ the tuner management component 308 to determine the desirable tuning setting for the set of antennas 312 and perform other functions or operations based at least in part on the sensor-based information and/or the electrical characteristics information (e.g., electrical measurement information) relating to the signals, as more fully disclosed herein.

Figure 4:
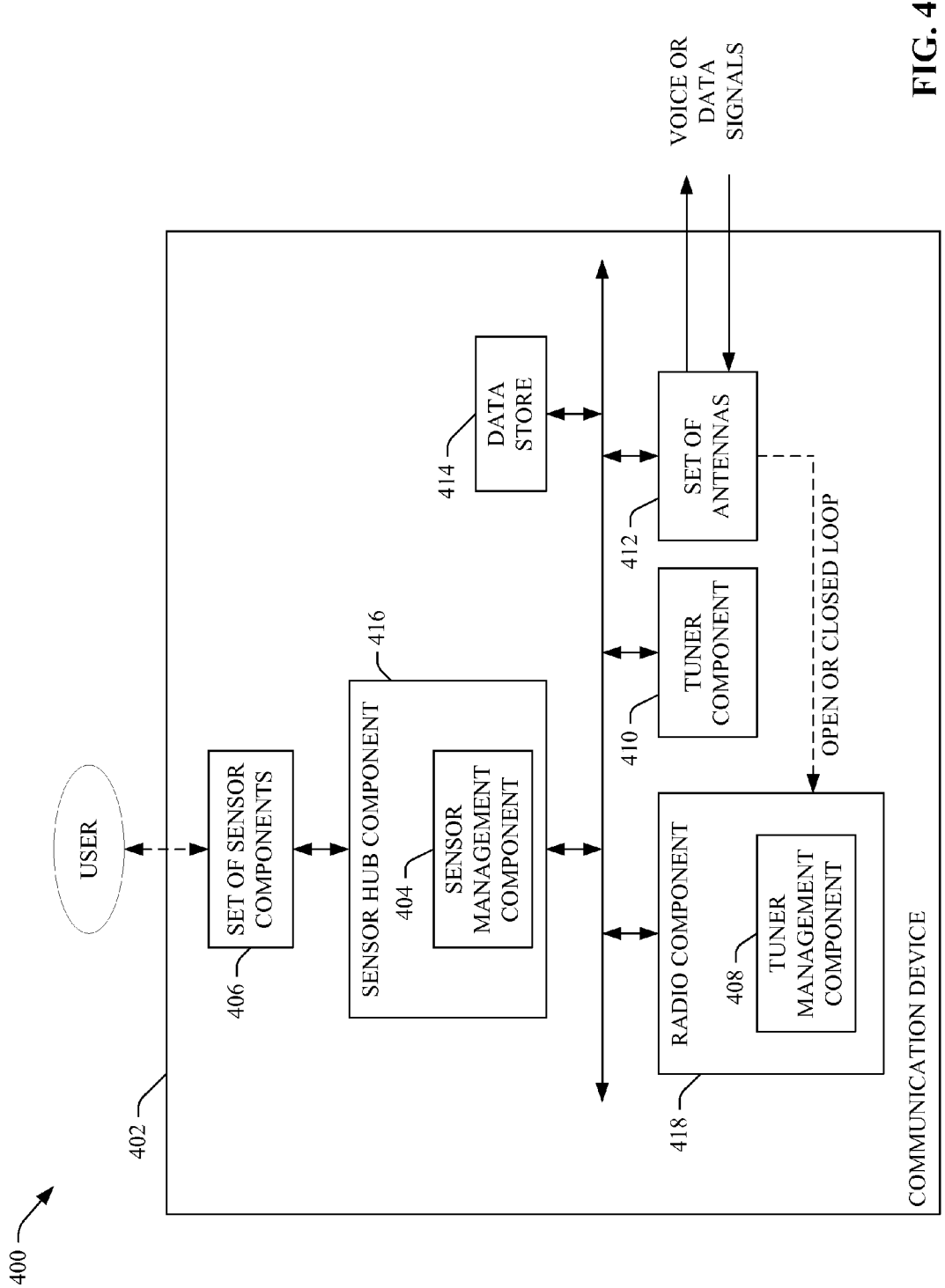
FIG. 4 illustrates a block diagram of an example system that can employ a sensor hub component that can perform sensor fusion to facilitate combining the use of sensor information and electrical measurements relating to received or transmitted signals to desirably tune one or more antennas of a communication device, in accordance with various aspects and embodiments of the disclosed subject matter.

FIG. 4 illustrates a block diagram of an example system 400 that can employ a sensor hub component that can perform sensor fusion to facilitate combining the use of sensor information and electrical measurements relating to received or transmitted signals to desirably tune one or more antennas of a communication device, in accordance with various aspects and embodiments of the disclosed subject matter. The system 400 can comprise a communication device 402, sensor management component 404, a set of sensor components 406, tuner management component 408, tuner component 410, a set of antennas 412, and data store 414, that, respectively, can be the same as or similar to, and/or can comprise the same or similar features or functionalities as, respective components (e.g., respectively named components), as more fully disclosed herein. In accordance with various implementations, the system 400 can employ closed-loop antenna tuning or open-loop antenna tuning to facilitate desirably tuning the set of antennas 412.

The communication device 400 can comprise a sensor hub component 416 that can comprise or be associated with a processor (e.g., a co-processor, a microcontroller, or other processing device or component) that can perform sensor fusion using sensor information received from the set of sensor components 406 to determine, generate, and provide sensor-based information relating to conditions associated with the communication device 402 (e.g., orientation and/or position of the device 402 in relation to the user, and/or movement of the device 402, etc.), which have been determined by the sensor management component 404, to the tuner management component 408. The sensor hub component 416 can comprise the sensor management component 404 to facilitate enabling the sensor hub component 416 to receive sensor information from the set of sensor components 406, determine conditions associated with the communication device 402, and/or provide sensor-based information to the tuner management component 408 for further use in determining the desirable tuning setting to apply to the set of antennas 412.

The communication device 400 also can comprise a radio component 418 that can be associated with (e.g., communicatively connected to) the sensor hub component 416. The radio component 418 also can be associated with the tuner component 410 and the set of antennas 412. The radio component 418 can comprise the tuner management component 408, wherein the radio component 418 (and tuner management component 408) can monitor, measure, and/or determine electrical characteristics relating to the signal being received or transmitted by the set of antennas 412. The radio component 418 (and tuner management component 408) also can receive sensor-based information from the sensor hub component 416. The radio component 418 can employ the tuner management component 408 to determine the desirable tuning setting for the set of antennas 412 and perform other functions or operations based at least in part on the sensor-based information and/or the electrical characteristics information (e.g., electrical measurement information) relating to the signals, as more fully disclosed herein.

Figure 5:
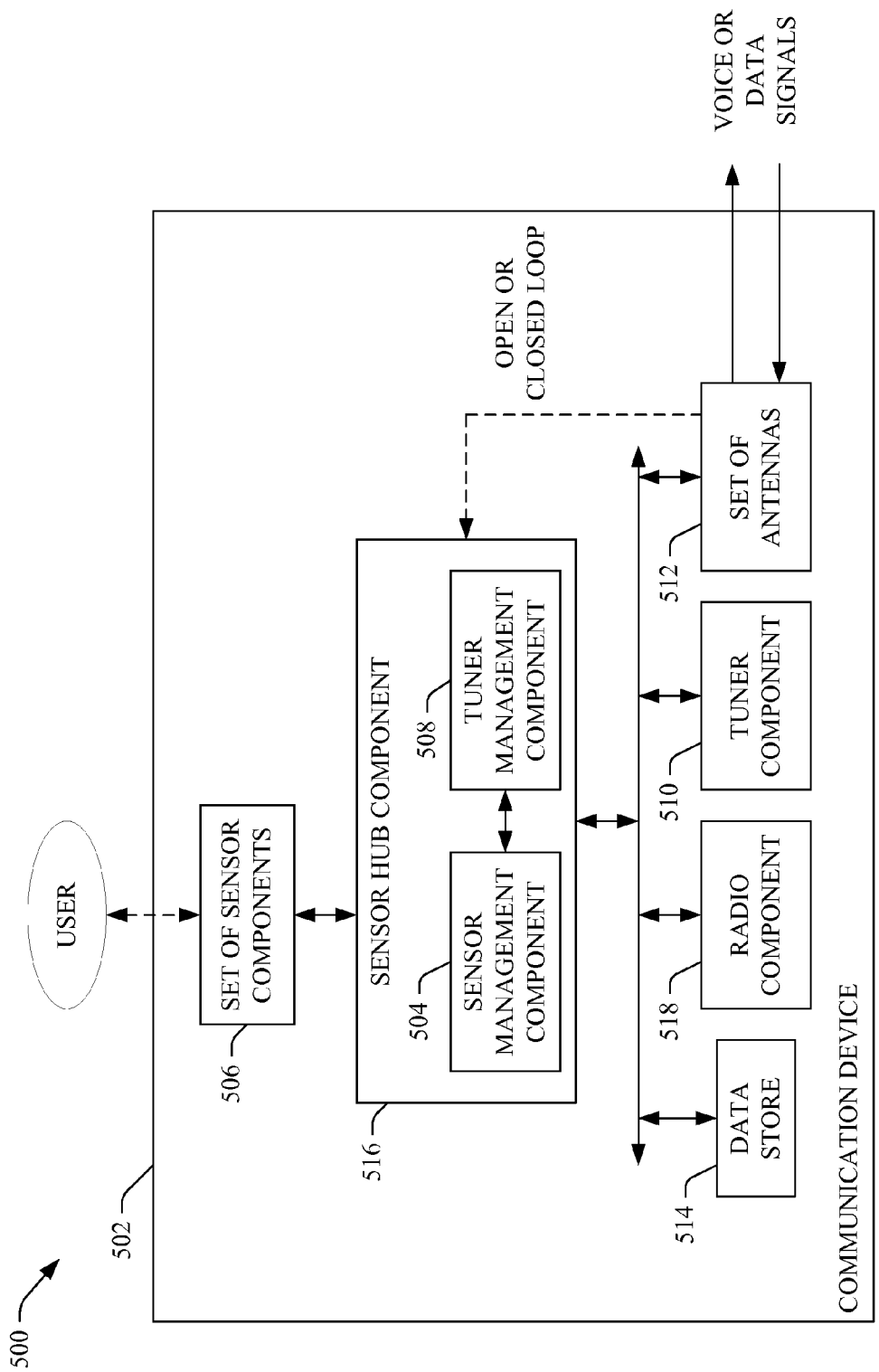
FIG. 5 depicts a block diagram of another example system that can employ a sensor hub component that can perform sensor fusion to facilitate combining the use of sensor information and electrical measurements relating to received or transmitted signals to desirably tune one or more antennas of a communication device, in accordance with various aspects and embodiments of the disclosed subject matter.

FIG. 5 depicts illustrates a block diagram of another example system 500 that can employ a sensor hub component that can perform sensor fusion to facilitate combining the use of sensor information and electrical measurements relating to received or transmitted signals to desirably tune one or more antennas of a communication device, in accordance with various aspects and embodiments of the disclosed subject matter. The system 500 can comprise a communication device 502, sensor management component 504, a set of sensor components 506, tuner management component 508, tuner component 510, a set of antennas 512, data store 514, a sensor hub component 516, and a radio component 518 that, respectively, can be the same as or similar to, and/or can comprise the same or similar features or functionalities as, respective components (e.g., respectively named components), as more fully disclosed herein. In accordance with various implementations, the system 500 can employ closed-loop antenna tuning or open-loop antenna tuning to facilitate desirably tuning the set of antennas 512.

The sensor hub component 516 can comprise or be associated with a processor (e.g., a co-processor, a microcontroller, or other processing device or component) that can facilitate processing information (e.g., sensor information, electrical characteristic or measurement information associated with a received or transmitted signal). The sensor hub component 516 can perform sensor fusion using sensor information received from the set of sensor components 506 to determine and generate sensor-based information relating to conditions associated with the communication device 502 (e.g., orientation and/or position of the device 502 in relation to the user, and/or movement of the device 502, etc.). For instance, the sensor hub component 516 can comprise the sensor management component 504 that can receive sensor information from the set of sensor components 506, determine conditions associated with the communication device 502, and/or generate sensor-based information for use in determining the desirable tuning setting to apply to the set of antennas 512, as more fully disclosed herein.

The radio component 518 can be associated with the sensor hub component 516 and the set of antennas 512. The radio component 518 can monitor the set of antennas 512, and can measure and/or determine electrical characteristics relating to the signal being received or transmitted by the set of antennas 512.

The sensor hub component 516 also can comprise the tuner management component 508, wherein the sensor management component 504 can communicate the sensor-based information to the tuner management component 508. The tuner management component 508 can determine the desirable tuning setting for the set of antennas 512 and perform other functions or operations based at least in part on the sensor-based information and/or the electrical characteristics information (e.g., electrical measurement information) relating to the signals, as more fully disclosed herein. The sensor hub component 516 can be associated with (e.g., connected to) the tuner component 510, wherein the tuner management component 508 of the sensor hub component 516 can communicate control information, which can correspond to the desirable tuning setting, to the tuner component 510. The tuner component can set or adjust the tuning of the set of antennas 512 based at least in part on the control information.

Figure 6:
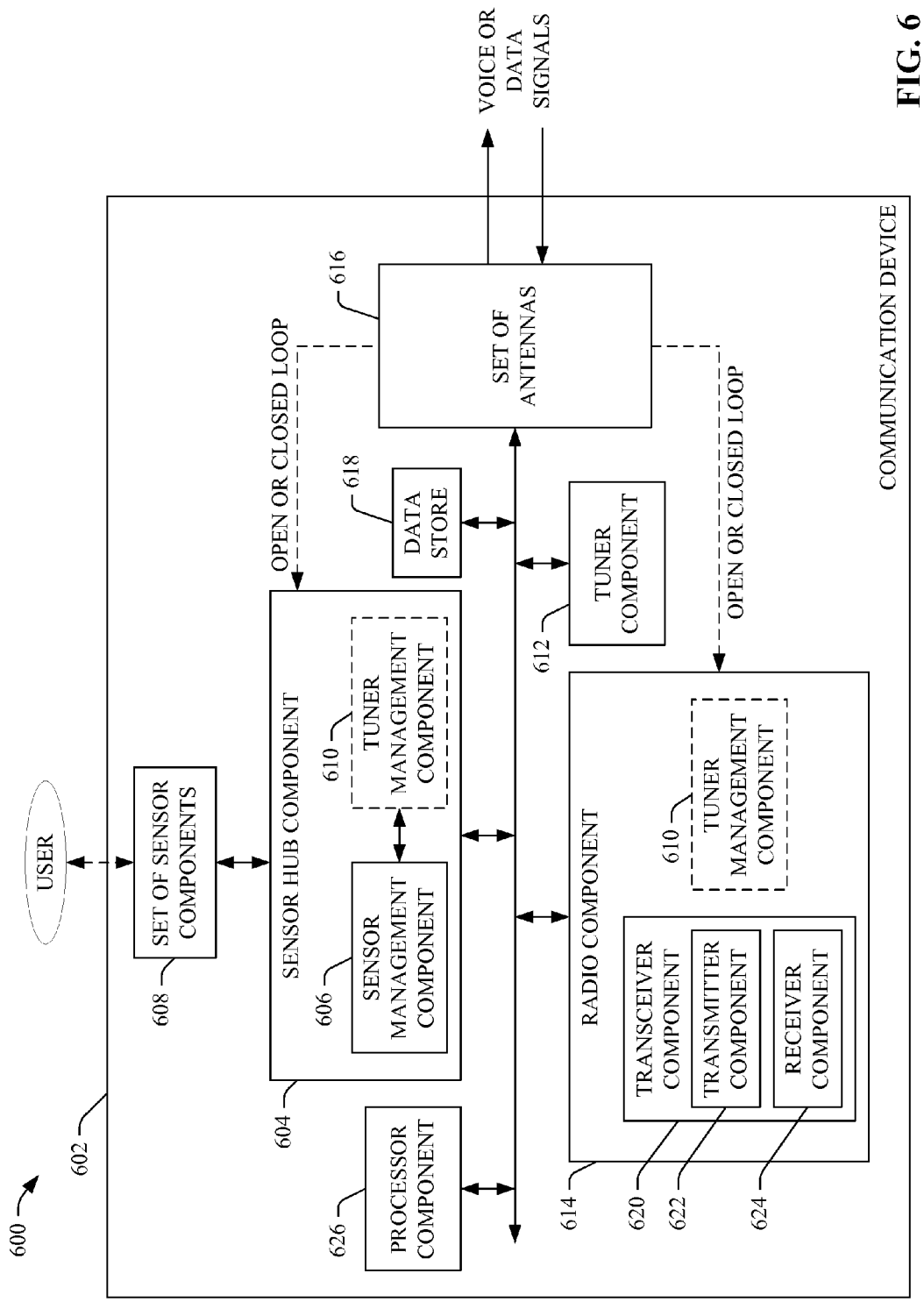
FIG. 6 illustrates a block diagram of an example system that can employ sensor fusion to desirably tune one or more antennas of a communication device using sensor information and/or electrical measurements relating to a signal received or transmitted by the communication device, in accordance with various aspects and embodiments of the disclosed subject matter.

FIG. 6 illustrates a block diagram of an example system 600 that can employ sensor fusion to desirably tune one or more antennas of a communication device using sensor information and/or electrical measurements relating to a signal received or transmitted by the communication device, in accordance with various aspects and embodiments of the disclosed subject matter. The system 600 can comprise a communication device 602, a sensor hub component 604, a sensor management component 606, a set of sensor components 608, a tuner management component 610, a tuner component 612, a radio component, 614, a set of antennas 616, and a data store 618, that, respectively, can be the same as or similar to, and/or can comprise the same or similar features or functionalities as, respective components (e.g., respectively named components), as more fully disclosed herein. In accordance with various implementations, the system 600 can employ closed-loop antenna tuning or open-loop antenna tuning to facilitate desirably tuning the set of antennas 616.

In some implementations, the tuner management component 610 can be part of the radio component 614. In other implementations, the tuner management component 610 can be part of the sensor hub component 604.

The radio component 614 can comprise a transceiver component 620 that can comprise a transmitter component 622 and a receiver component 624. The transmitter component 622 can comprise one or more transmitters that can facilitate transmitting voice or data communications from the communication device 602 to another communication device. The transmitter component 622 can be associated with (e.g., connected to) one or more sensing devices such as one or more antennas of the set of antennas 616 that can facilitate voice or data communications.

The receiver component 624 can comprise one or more receivers that can facilitate receiving voice or data communications from another communication device. The receiver component 624 can be associated with (e.g., connected to) one or more sensing devices such as one or more antennas of the set of antennas 616 that can facilitate voice or data communications.

The transceiver component 620 also can be associated with other components, such as, for example, the tuner component 612, tuner management component 610, processor component 626, and/or data store 618. In some implementations, the transceiver component 620 can comprise a full-duplex communication system that can allow simultaneous communication in both directions (e.g., simultaneous transmission and reception of voice or data communications). In accordance with various implementations, the radio component 614 can comprise the transceiver component 620 (e.g., RF transceiver) and/or a baseband processor (not shown), as well as other devices supporting the communication of voice or data signals.

The processor component 626 can work in conjunction with the other components (e.g., sensor hub component 604, sensor management component 606, set of sensor components 608, tuner management component 610, tuner component 612, radio component, 614, set of antennas 616, data store 618, etc.) to facilitate performing the various functions of the system 600. The processor component 626 can employ one or more processors, microprocessors, or controllers that can process data, such as information relating to applications, users, receiving or transmitting voice or data signals, sensing conditions associated with the communication device 602, determining tuning settings to apply to the set of antennas 616, models and data describing or characterizing interactions between a user's body and the communication device 602, mappings, policies, defined antenna tuning criteria, algorithms (e.g., defined antenna tuning algorithm, defined search algorithm), protocols, interfaces, tools, and/or other information, to facilitate operation of the system 600, as more fully disclosed herein, and control data flow between the communication device 602 and other components (e.g., communication network, base station, an application, a server or other communication device, a cloud, etc.) associated with the communication device 602.

The data store 618 can store data structures (e.g., user data, metadata), code structure(s) (e.g., modules, objects, hashes, classes, procedures) or instructions, information relating to applications, users, receiving or transmitting voice or data signals, sensing conditions associated with the communication device 602, determining tuning settings to apply to the set of antennas 616, models and data describing or characterizing interactions between a user's body and the communication device 602, mappings, policies, defined antenna tuning criteria, algorithms, protocols, interfaces, tools, and/or other information, to facilitate controlling operations associated with the communication device 602. In an aspect, the processor component 626 can be functionally coupled (e.g., through a memory bus) to the data store 618 in order to store and retrieve information desired to operate and/or confer functionality, at least in part, to the sensor hub component 604, sensor management component 606, set of sensor components 608, tuner management component 610, tuner component 612, radio component, 614, set of antennas 616, etc., and/or substantially any other operational aspects of the communication device 602.

Figure 7:
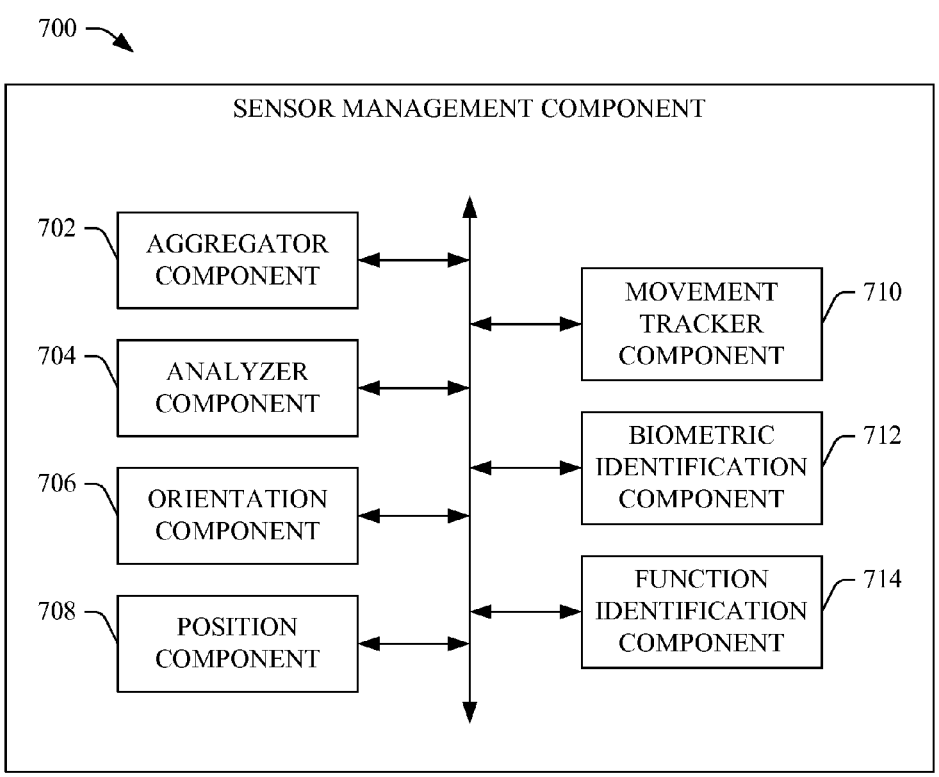
FIG. 7 depicts a block diagram of an example sensor management component that can facilitate employing sensor fusion to facilitate desirably tuning one or more antennas of a communication device based at least in part on sensor information, in accordance with various aspects and embodiments of the disclosed subject matter.

FIG. 7 depicts a block diagram of an example sensor management component 700 that can facilitate employing sensor fusion to facilitate desirably tuning one or more antennas of a communication device based at least in part on sensor information, in accordance with various aspects and embodiments of the disclosed subject matter. The sensor management component 700 can process data, such as sensor information, received from one or more sensor components associated with the communication device. The sensor management component 700 can generate sensor-based information, based at least in part on the results of an analysis of the sensor information, wherein the sensor-based information can indicate, for example, the orientation and/or position of the communication device with respect to the device user, movement of the communication device, and/or other conditions associated with the communication device. The sensor management component 700 can provide the sensor-based information to the tuner management component for use in determining a desirable antenna tuning setting to employ to set or adjust the tuning of a set of antennas of the communication device, as more fully disclosed herein.

The sensor management component 700 can comprise an aggregator component 702 that can aggregate data received (e.g., obtained) from various entities (e.g., a sensor component, an application, a radio component, a communication device, a processor, a data store, etc.). The aggregator component 702 can correlate respective items of data based at least in part on type of data (e.g., communication-device orientation related data, communication-device position related data, communication-device movement related data, touch sensor related data, electrical measurement information, video content, audio content, textual data, metadata, etc.), source (e.g., particular sensor component) of the data, antenna tuning setting to which the data (e.g., data relating to conditions associated with the communication device) relates, time or date the data was generated or received, etc., to facilitate analyzing of the data by the analyzer component 704. For example, the aggregator component 702 can aggregate data relating to an accelerometer and/or gyroscope to facilitate determining an orientation and/or a position of the communication device in relation to the user or other entity.

The analyzer component 704 can analyze data to facilitate determining an orientation and/or a position of the communication device in relation to the communication device user, movement of the communication device, other conditions associated with the communication device, a desirable search initialization point to use to begin a search for a desirable tuning setting (e.g., as determined by the tuner management component), a desirable tuning setting (e.g., as determined by the tuner management component), etc., based at least in part on the data analysis. For example, the analyzer component 704 can analyze sensor information obtained from one or more sensor components to facilitate determining the orientation and/or position of the communication device in relation to the user, wherein information (e.g., sensor-based information) relating to the orientation and/or position of the communication device in relation to the user can be used to facilitate determining a desirable search initialization point and/or a desirable tuning setting to facilitate tuning the set of antennas.

The sensor management component 700 can comprise an orientation component 706 that can determine the orientation of the communication device with respect to the user or other entity (e.g., the ground) based at least in part on sensor information obtained from one or more sensor components. For instance, sensor information can be obtained from one or more sensor components, such as an accelerometer and/or a gyroscope, wherein such sensor information can indicate the orientation of the communication device with respect to the user or other entity. Based at least in part on the results of an analysis of that sensor information, the orientation component 706 can determine the orientation of the communication device with respect to the user or other entity.

The sensor management component 700 also can contain a position component 708 that can determine the position (e.g., location) of the communication device with respect to the user or other entity based at least in part on sensor information obtained from one or more sensor components. For example, sensor information can be obtained from one or more sensor components, such as the accelerometer, gyroscope, proximity sensor, touch sensor, and/or another sensor(s), wherein such sensor information can indicate the position of the communication device with respect to the user or other entity. Based at least in part on the results of an analysis of that sensor information, the position component 708 can determine the position or location of the communication device with respect to the user or other entity. For instance, the position component 708 can determine that the communication device is being held by the user at a defined distance (e.g., 0 inches (e.g., device is being held against the user's ear), 0.25 inches) away from the user's head, if the sensor information indicates that the communication device is being held by the user at the defined distance away from the user's head.

The sensor management component 700 can comprise a movement tracker component 710 that can track and identify movement of the communication device based at least in part on sensor information. For instance, sensor information can be obtained from one or more sensor components, such as the accelerometer, gyroscope, and/or another sensor component(s), wherein such sensor information can indicate whether the communication device is moving, what direction the communication device is moving in (if it is moving), or whether the communication device is not moving or is moving relatively little. Based at least in part on the results of an analysis of that sensor information, the movement tracker component 710 can determine whether or not the communication device is moving, and, if it is moving, the direction it is moving in and/or the speed at which it is moving in that direction.

The sensor management component 700 can comprise a biometric identification component 712 that can determine an identity of a user, and/or differentiate between different users of the communication device, based at least in part on the sensor information. As some examples, sensor information can be obtained from one or more sensor components, such as one or more microphones of the communication device, a fingerprint sensor (e.g., fingerprint scanner), and/or an eye sensor (e.g., an eye scanner), wherein such sensor information can comprise voice-related information, fingerprint-related information, and/or eye-related information (e.g., information relating to the iris or retina of a user). Based at least in part on the results of an analysis of the sensor information, the biometric identification component 712 can determine the identity of a user or at least can distinguish between different users (e.g., distinguish between different voices of users, different fingerprints of users, different eye characteristics of users) who have used the communication device.

The sensor management component 700 also can include a function identification component 714 that can identify or determine when and which functions of a communication device are being used based at least in part on the sensor information. For instance, sensor information can be obtained from one or more sensor components, such as an external component sensor and/or a function sensor of the communication device, wherein such sensor information can indicate whether a wired or wireless earbud and/or microphone device is being used with the communication device (e.g., a wired earbud and/or microphone device is plugged into the headphone/microphone jack of the communication device, a wireless earbud and/or microphone device is wirelessly connected to the communication device), or whether a speakerphone function is turned on for the communication device, during a communication session. Based at least in part on the results of an analysis of that sensor information, the function identification component 714 can determine whether a wired or wireless earbud and/or microphone device is being used with the communication device, or whether the speakerphone function is turned on for the communication device.

In accordance with various implementations, the sensor management component 700 also can comprise or be associated with a processor component and/or a data store. The processor component can work in conjunction with components (e.g., aggregator component 702, analyzer component 704, orientation component 706, data store, etc.) of or associated with the sensor management component 700 to facilitate performing the various functions of the sensor management component 700. The processor component can employ one or more processors, microprocessors, or controllers that can process data, such as information relating to applications, users, sensor components associated with the communication device, policies, defined antenna tuning criteria, algorithms, protocols, interfaces, tools, and/or other information, to facilitate operation of the sensor management component 700, as more fully disclosed herein, and control data flow between the sensor management component 700 and other components (e.g., sensor component, tuner management component, radio component, etc.) associated with the sensor management component 700.

The data store can store data structures (e.g., user data, metadata), code structure(s) (e.g., modules, objects, hashes, classes, procedures) or instructions, information relating to applications, users, sensor components associated with the communication device, policies, defined antenna tuning criteria, algorithms, protocols, interfaces, tools, and/or other information, to facilitate controlling operations associated with the sensor management component 700. In an aspect, the processor component can be functionally coupled (e.g., through a memory bus) to the data store in order to store and retrieve information desired to operate and/or confer functionality, at least in part, to the aggregator component 702, analyzer component 704, orientation component 706, etc., and/or substantially any other operational aspects of the sensor management component 700.

Figure 8:
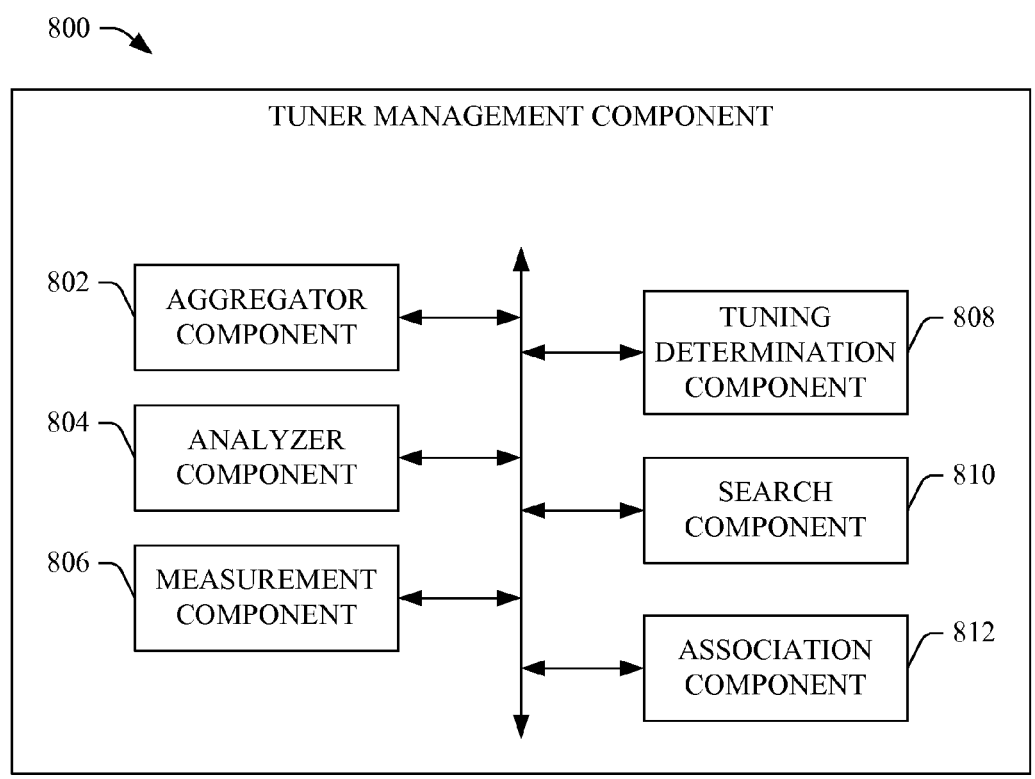
FIG. 8 illustrates a block diagram of an example tuner management component that can facilitate employing sensor fusion to facilitate desirably tuning one or more antennas of a communication device based at least in part on sensor information and/or electrical measurements relating to a signal received or transmitted by the communication device, in accordance with various aspects and embodiments of the disclosed subject matter.

FIG. 8 illustrates a block diagram of an example tuner management component 800 that can facilitate employing sensor fusion to facilitate desirably tuning one or more antennas of a communication device based at least in part on sensor information and/or electrical measurements relating to a signal received or transmitted by the communication device, in accordance with various aspects and embodiments of the disclosed subject matter.

The tuner management component 800 can comprise an aggregator component 802 that can aggregate data received (e.g., obtained) from various entities (e.g., a sensor management component, an application, a radio component, a tuner component, a communication device, a set of antennas, a processor, a data store, etc.). The aggregator component 802 can correlate respective items of data based at least in part on type of data (e.g., communication-device orientation related data, communication-device position related data, communication-device movement related data, touch sensor related data, electrical measurement information, media content, textual data, metadata, etc.), source (e.g., particular sensor component) of the data, antenna tuning setting to which the data (e.g., data relating to conditions associated with the communication device) relates, time or date the data was generated or received, etc., to facilitate analyzing of the data by the analyzer component 804. For example, the aggregator component 802 can aggregate data relating to a desirable tuning setting and a set of conditions associated with the communication device in connection with the desirable tuning setting to facilitate generating a mapping or other association between the desirable tuning setting and the set of conditions.

The analyzer component 804 can analyze data to facilitate determining a desirable search initialization point to use to begin a search for a desirable tuning setting, determining a desirable tuning setting, associating a desirable tuning setting with a set of conditions associated with the communication device, and/or other antenna-tuning-related determinations, based at least in part on the data analysis. For example, the analyzer component 804 can analyze sensor-based information received from the sensor management component and/or electrical measurement information relating to a signal being received or transmitted by the communication device to facilitate determining the desirable search initialization point and/or desirable tuning setting (e.g., a convergence or optimum point associated with the desirable tuning setting at which the antenna tuning search can be ended in accordance with the defined search algorithm).

The tuner management component 800 also can comprise a measurement component 806 can monitor conditions associated with one or more antennas of the communication device and signals being received or transmitted by the communication device via the one or more antennas. The measurement component 806 can determine or measure electrical characteristics relating to signals being received or transmitted by the communication device. The measurement component 806 can generate electrical measurement information relating to the signals, wherein the electrical measurement information can be used with the sensor-based information to determine a desirable search initialization point and/or a desirable tuning setting to apply for tuning the set of antennas.

The tuner management component 800 can include a tuning determination component 808 that can determine respective desirable tuning settings to use to tune the set of antennas under respective conditions associated with the communication device, based at least in part on the results of the analysis of the sensor-based information and/or the electrical measurement information, in accordance with the defined antenna tuning algorithm and defined antenna tuning criteria, as more fully disclosed. In some implementations, the tuning determination component 808 can employ a search component 810 that can determine a desirable search initialization point to use to begin a search for a desirable tuning setting, and can search for and determine a desirable tuning setting among a set of tuning settings based at least in part on the results of an analysis of the sensor-based information and/or the electrical measurement information, in accordance with the defined antenna tuning algorithm and defined antenna tuning criteria.

The tuner management component 800 can include an association component 812 that can associate, map, or link a desirable (e.g., optimal, suitable, acceptable) tuning setting with or to a set of conditions associated with the communication device based at least in part on the sensor-based information. For instance, based at least in part on the results of an analysis of the sensor-based information and/or the electrical measurement information, the association component 812 can map, link, or otherwise associate respective desirable tuning settings with or to respective sets of conditions associated with the communication device. The association component 812 also can determine, infer, interpolate, and/or extrapolate other desirable tuning settings or desirable search initialization points that can be respectively associated with other sets of conditions associated with the communication device based at least in part on the previously determined associations between respective desirable tuning settings and respective sets of conditions associated with the communication device. Association information relating to associations between respective desirable tuning settings and respective sets of conditions associated with the communication device can be stored in the data store for future use by the tuning determination component 808 in efficiently determining desirable tuning settings (or at least desirable search initialization points) to use to facilitate tuning the set of antennas.

In accordance with various implementations, the tuner management component 800 also can comprise or be associated with a processor component and/or a data store. The processor component can work in conjunction with components (e.g., aggregator component 802, analyzer component 804, measurement component 806, data store, etc.) of or associated with the tuner management component 800 to facilitate performing the various functions of the tuner management component 800. The processor component can employ one or more processors, microprocessors, or controllers that can process data, such as information relating to applications, users, sensed conditions associated with the communication device, electrical measurements relating to received or transmitted signals, policies, defined antenna tuning criteria, defined antenna tuning and defined search algorithms, protocols, interfaces, tools, and/or other information, to facilitate operation of the tuner management component 800, as more fully disclosed herein, and control data flow between the tuner management component 800 and other components (e.g., sensor management component, radio component, tuner component, set of antennas, etc.) associated with the tuner management component 800.

The data store can store data structures (e.g., user data, metadata), code structure(s) (e.g., modules, objects, hashes, classes, procedures) or instructions, information relating to applications, users, sensed conditions associated with the communication device, electrical measurements relating to received or transmitted signals, policies, defined antenna tuning criteria, defined antenna tuning and defined search algorithms, protocols, interfaces, tools, and/or other information, to facilitate controlling operations associated with the tuner management component 800. In an aspect, the processor component can be functionally coupled (e.g., through a memory bus) to the data store in order to store and retrieve information desired to operate and/or confer functionality, at least in part, to the aggregator component 802, analyzer component 804, measurement component 806, etc., and/or substantially any other operational aspects of the tuner management component 800.

In accordance with various embodiments of the disclosed subject matter, components (e.g., sensor management component, tuning management component, tuner component, radio component, etc.) of an antenna tuning system can be situated or implemented on a single IC die or chip. An IC chip can be a CMOS chip, for example. In accordance with various other embodiments, the components of the antenna tuning system can be implemented on an ASIC chip. In accordance with still other embodiments, the components of the antenna tuning system can be situated or implemented on multiple IC dies or chips.

The aforementioned devices and/or systems have been described with respect to interaction between several components. It should be appreciated that such systems and components can include those components or sub-components specified therein, some of the specified components or sub-components, and/or additional components. Sub-components could also be implemented as components coupled to and/or communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 9-14 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter.

Figure 9:
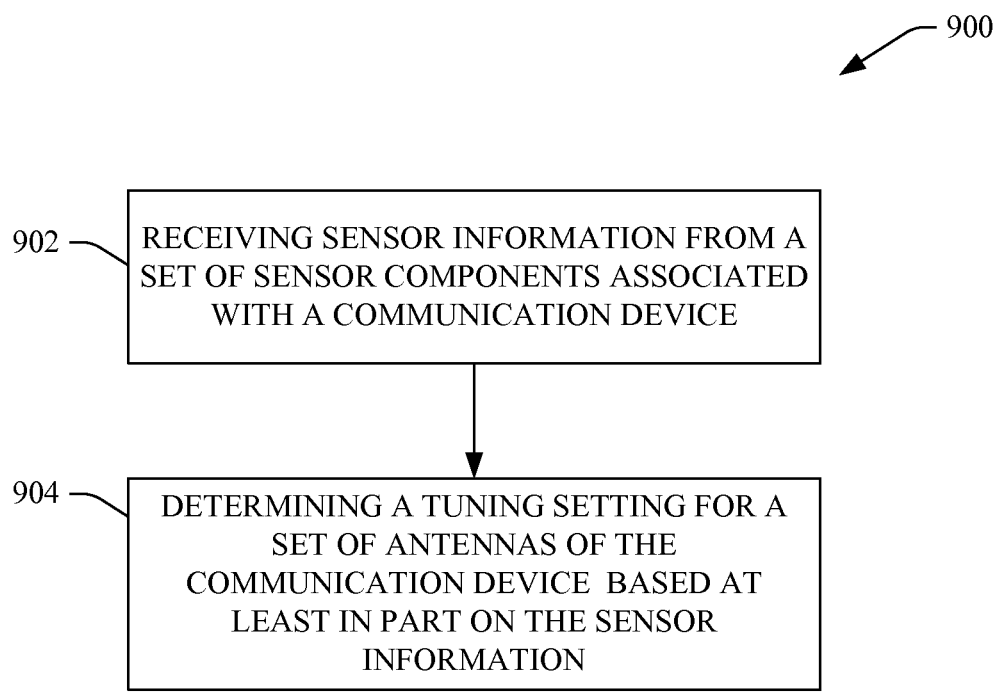
FIG. 9 illustrates a flow diagram of an example method for tuning a set of antennas of a communication device, in accordance with various aspects and embodiments of the disclosed subject matter.

Referring to FIG. 9, illustrated is a flow diagram of an example method 900 for tuning a set of antennas of a communication device (e.g., wireless device), in accordance with various aspects and embodiments of the disclosed subject matter. The method 900 can be implemented by an antenna tuning system comprising a sensor management component and a tuner management component, for example.

At 902, sensor information can be received from a set of sensor components associated with a communication device (e.g., wireless device). The sensor management component can receive sensor information from the set of sensor components (e.g., proximity sensor, audio sensor (e.g., microphone), visual sensor (e.g., camera), light sensor, temperature sensor, accelerometer, gyroscope) associated with the communication device.

At 904, a tuning setting for a set of antennas of the communication device can be determined based at least in part on the sensor information. The sensor management component can determine the orientation and/or position (e.g., location) of the communication device in relation to the user of the communication device, and/or can track and determine the movement of the communication device (e.g., as the user is walking with the communication device, as the user drives in his vehicle while using the communication device), based at least in part on the results of an analysis of the sensor information received from one or more of the sensor components of the set of sensor components. The sensor management component can generate sensor-based information based at least in part on the analysis results, wherein the sensor-based information can indicate the orientation and/or position of the communication device in relation to the user, and/or the movement of the communication device. The sensor management component can communicate the sensor-based information to the tuner management component.

The tuner management component can analyze the sensor-based information and/or can perform an antenna tuning search (e.g., in accordance with the defined search algorithm) to determine a desirable (e.g., optimal, suitable, acceptable) tuning setting for the set of antennas based at least in part on the sensor-based information. In some implementations, the tuner management component also can determine electrical measurements relating to a signal being transmitted or received by the communication device, and can determine the tuning setting for the set of antennas (e.g., in accordance with the defined search algorithm) based at least in part on the sensor-based information and the electrical measurements.

The tuner management component can generate control information (e.g., antenna adjustment information) based at least in part on the tuning setting. The tuner management component can transmit the control information to the tuner component, wherein the tuner component can adjust the tuning setting for the set of antennas (e.g., adjust the frequency or impedance of an antenna, switch from one antenna to another antenna) based at least in part on the control information.

Figure 10:
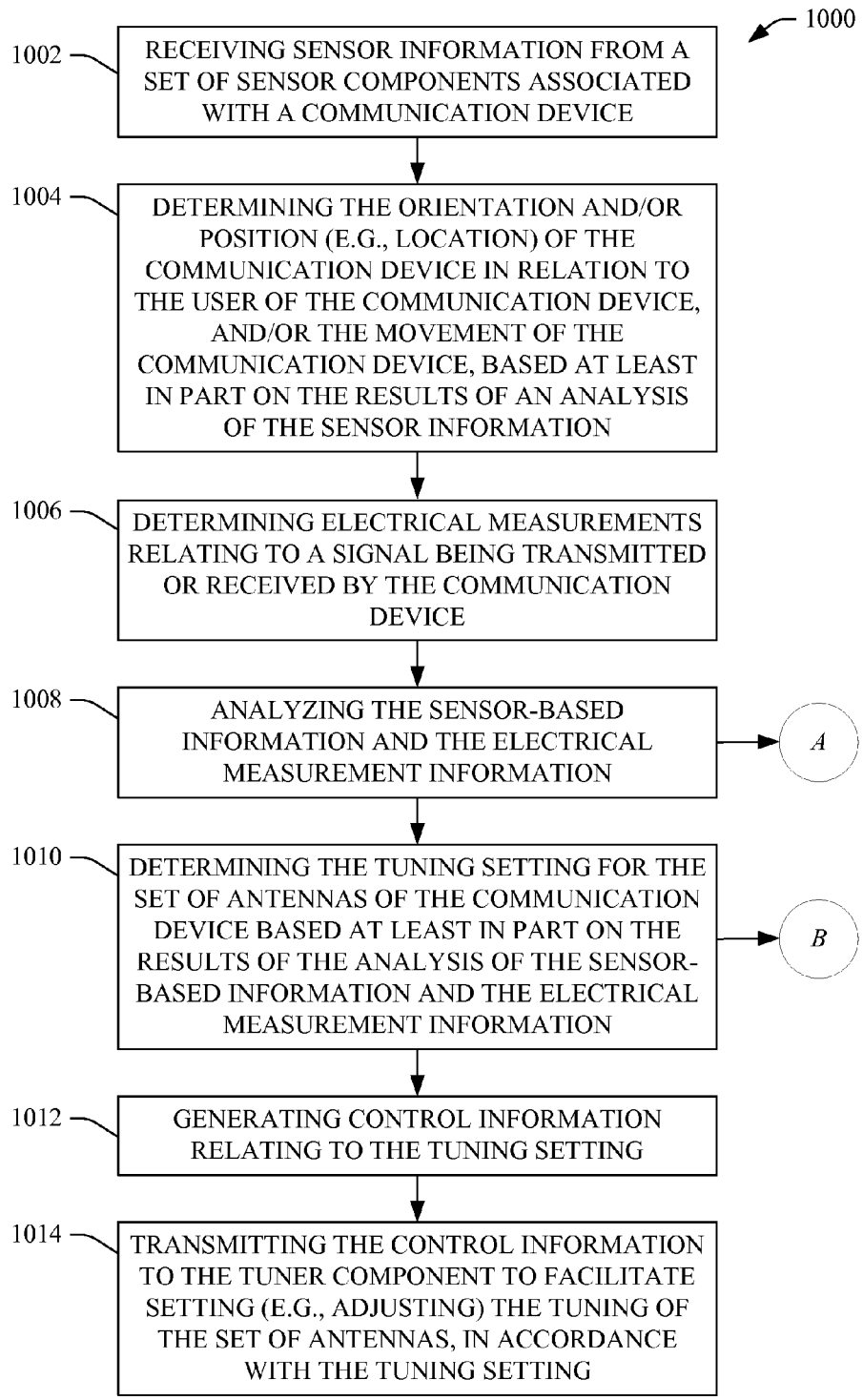
FIG. 10 depicts a flow diagram of another example method for tuning a set of antennas of a communication device, in accordance with various aspects and embodiments of the disclosed subject matter.

Turning to FIG. 10, depicted is a flow diagram of another example method 1000 for tuning a set of antennas of a communication device, in accordance with various aspects and embodiments of the disclosed subject matter. The method 1000 can be implemented by an antenna tuning system comprising a sensor management component and a tuner management component, for example.

At 1002, sensor information can be received from a set of sensor components associated with a communication device (e.g., wireless device). The sensor management component can receive sensor information from the set of sensor components (e.g., proximity sensor, audio sensor (e.g., microphone), visual sensor (e.g., camera), light sensor, temperature sensor, accelerometer, gyroscope) associated with the communication device.

At 1004, the orientation and/or position (e.g., location) of the communication device in relation to the user of the communication device can be determined, and/or the movement of the communication device can be determined, based at least in part on the results of an analysis of the sensor information received from one or more of the sensor components of the set of sensor components. The sensor management component can determine the orientation and/or position (e.g., location) of the communication device in relation to the user of the communication device, and/or can track and determine the movement of the communication device, based at least in part on the results of an analysis of the sensor information received from one or more of the sensor components of the set of sensor components. The sensor management component can generate sensor-based information based at least in part on the analysis results, wherein the sensor-based information can indicate the orientation and/or position of the communication device in relation to the user, and/or the movement of the communication device. The sensor management component can communicate the sensor-based information to the tuner management component At 1006, electrical measurements relating to a signal being transmitted or received by the communication device can be determined. The tuner management component can monitor and measure the electrical characteristics of the signal being transmitted or received by the communication device to determine the electrical measurement for the signal.

At 1008, the sensor-based information and the electrical measurement information can be analyzed. The tuner management component can analyze the sensor-based information and the electrical measurement information to facilitate determining the tuning setting. As some examples, the tuner management component can analyze such information, and can perform a search for a desirable tuning setting using the defined search algorithm or can determine whether the sensor-based information and the electrical measurement information match or at least substantially match a set of conditions associated with (e.g., linked or mapped to) a particular tuning setting. In some implementations, the method 1000 can proceed to reference point A, wherein the method 1100 can proceed from reference point A after the analysis of the sensor-based information and the electrical measurement information is performed.

At 1010, the tuning setting for the set of antennas of the communication device can be determined based at least in part on the results of the analysis of the sensor-based information and the electrical measurement information. The tuner management component can determine the tuning setting (e.g., optimal, suitable, or acceptable tuning setting) for the set of antennas (e.g., in accordance with the defined search algorithm) based at least in part on the sensor-based information and the electrical measurement information. As the tuner management component can determine the tuning setting based at least in part on the sensor-based information, the tuning setting can be based at least in part on the orientation and/or position of the communication device in relation to the user of the communication device, and/or the movement of the communication device. While the method 1000 describes determining the tuning setting for the set of antennas based at least in part on the results of the analysis of the sensor-based information and the electrical measurement information, in some implementations, the method 1000 can determine the tuning setting for the set of antennas based at least in part on the results of the analysis of the sensor-based information (e.g., when performing open-loop antenna tuning).

In some implementations, at this point, the method 1000 can proceed to reference point B (in addition to proceeding to reference numeral 1012 of method 1000), wherein the method 1200 can proceed from reference point B after the tuning setting is determined.

At 1012, control information relating to the tuning setting can be generated. The tuner management component can generate control information (e.g., antenna adjustment information), which can correspond to the tuning setting, to facilitate adjusting the tuning of the set of antennas. The antenna adjustments can relate to, for example, adjusting the frequency or impedance of one or more antennas, or switching from one antenna to another antenna.

At 1014, the control information can be transmitted to the tuner component to facilitate setting (e.g., adjusting) the tuning of the set of antennas, in accordance with the tuning setting. The tuner management component can communicate the control information to the tuner component. The tuner component can set or adjust the tuning of the set of antennas, based at least in part on the control information, to tune the set of antennas, in accordance with the tuning setting.

Figure 11:
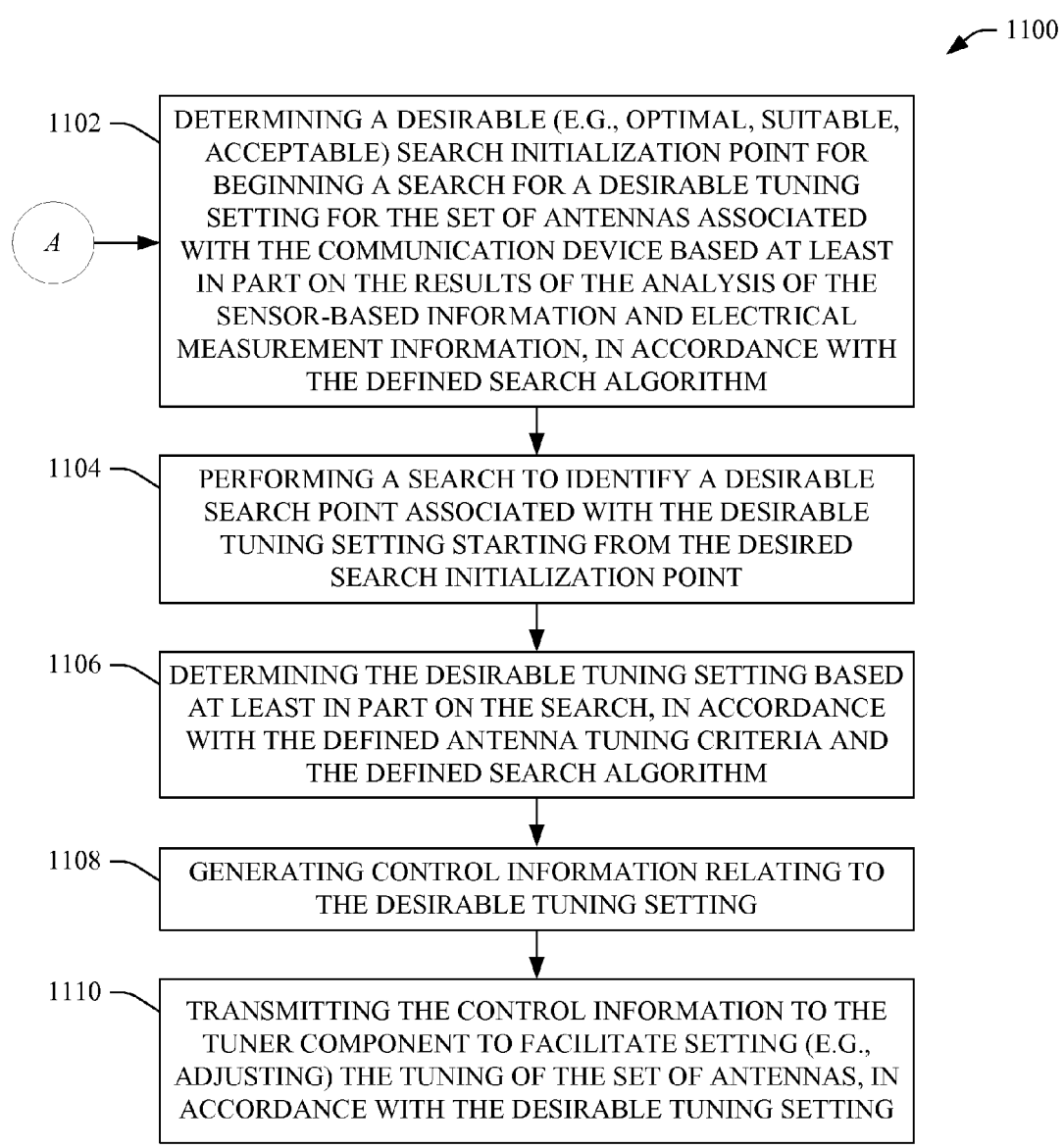
FIG. 11 illustrates a flow diagram of an example method for searching for a desired tuning setting for use in tuning a set of antennas of a communication device, in accordance with various aspects and embodiments of the disclosed subject matter.

Referring to FIG. 11, illustrated is a flow diagram of an example method 1100 for searching for a desired tuning setting for use in tuning a set of antennas of a communication device, in accordance with various aspects and embodiments of the disclosed subject matter. The method 1100 can be implemented by an antenna tuning system comprising a sensor management component and a tuner management component, for example.

In some implementations, the method 1100 can proceed from reference point A of the method 1000. At reference point A, sensor information has been obtained from the set of sensor components associated with the communication device, electrical measurements relating to the signal being transmitted or received by the communication device have been performed, and the sensor-based information and electrical measurement information have been analyzed. The sensor-based information can relate to (e.g., can indicate) the orientation and/or position (e.g., location) of the communication device with respect to the communication device user, and/or the movement of the communication device.

At 1102, a desirable (e.g., optimal, suitable, acceptable) search initialization point for beginning a search for a desirable tuning setting for the set of antennas associated with the communication device can be determined based at least in part on the results of the analysis of the sensor-based information and electrical measurement information, in accordance with the defined search algorithm. The tuner management component can determine the desirable search initialization point of a set of search points based at least in part on the analysis results, in accordance with the defined search algorithm. Each search point of the set of search points can relate to a different tuning setting. The sensor-based information can enable the tuner management component to refine, and make more efficient, the search for the tuning setting, as the tuner management component can exclude a subset of the set of search points from the search and can start the search at a search initialization point that can be closer to the desirable tuning setting than the subset of search points excluded from the search.

At 1104, starting from the desirable search initialization point, a search to identify a desirable (e.g., optimal, suitable, acceptable) search point associated with the desirable tuning setting can be performed. The tuner management component can start the search for the desirable search point at the desirable search initialization point. The tuner management component can continue the search for the desirable search point by analyzing one or more search points (starting with the search initialization point) until the desirable search point is determined or identified, in accordance with the defined search algorithm and defined antenna tuning criteria, wherein the desirable search point can be the end search point (e.g., convergence point or optimum point) at which the tuner management component and defined search algorithm have converged on the desirable tuning setting and the search for the desirable antenna tuning can be terminated.

At 1106, the desirable tuning setting can be determined based at least in part on the search, in accordance with the defined antenna tuning criteria and the defined search algorithm. Performing the search, and employing the defined search algorithm, the tuner management component can determine the desirable search point associated with the desirable tuning setting based at least in part on the defined antenna tuning criteria.

At 1108, control information relating to the desirable tuning setting can be generated. The tuner management component can generate control information (e.g., antenna adjustment information), which can correspond to the desirable tuning setting, to facilitate adjusting the tuning of the set of antennas. The antenna adjustments can relate to, for example, adjusting the frequency or impedance of one or more antennas, or switching from one antenna to another antenna.

At 1110, the control information can be transmitted to the tuner component to facilitate setting (e.g., adjusting) the tuning of the set of antennas, in accordance with the desirable tuning setting. The tuner management component can communicate the control information to the tuner component. The tuner component can set or adjust the tuning of the set of antennas, based at least in part on the control information, to tune the set of antennas, in accordance with the desirable tuning setting.

Figure 12:
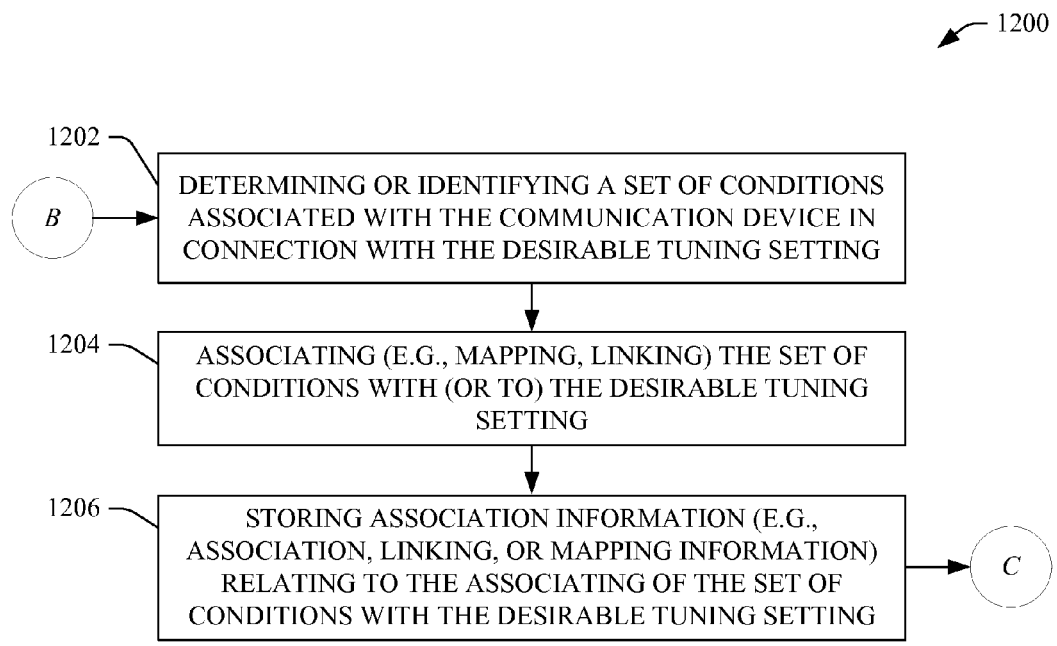
FIG. 12 depicts a flow diagram of an example method for associating respective tuning settings for a set of antennas of a communication device with respective sets of conditions to facilitate efficient determinations of tuning settings for the communication device, in accordance with various aspects and embodiments of the disclosed subject matter.

FIG. 12 depicts a flow diagram of an example method 1200 for associating respective tuning settings for a set of antennas of a communication device with respective sets of conditions to facilitate efficient determinations of tuning settings for the communication device, in accordance with various aspects and embodiments of the disclosed subject matter. The method 1200 can be implemented by an antenna tuning system comprising a sensor management component and a tuner management component, for example.

In some implementations, the method 1200 can proceed from reference point B of the method 1000. At reference point B, the tuning setting for the set of antennas of the communication device has been determined based at least in part on the results of the analysis of the sensor-based information and/or the electrical measurement information.

At 1202, a set of conditions associated with the communication device can be determined or identified in connection with the desirable (e.g., optimal, suitable, acceptable) tuning setting. The tuner management component can determine or identify the set of conditions in connection with the desirable tuning setting. The set of conditions can comprise or relate to orientation and/or position (e.g., location) of the communication device in relation to the communication device user, movement of the communication device, geographical location of the communication device, ambient temperature experienced by the communication device, a type of touching (e.g., finger(s), hand, ear, and/or face touching the communication device), an amount of touch pressure, and/or a location of the touching on the communication device (e.g., from the holding or gripping of the communication device by the user, or from the user's ear or face touching the communication device), electrical measurements relating to the signal being transmitted or received by the communication device, identity of the user, and/or other conditions.

At 1204, the set of conditions can be associated with (e.g., mapped to, linked to) the desirable tuning setting. The tuner management component can associate the set of conditions with the desirable tuning setting. For example, the tuner management component can generate a mapping of respective sets of conditions, comprising the set of conditions, to respective desirable tuning settings, comprising the desirable tuning setting, or generate a table that can comprise the respective sets of conditions that can correspond to (e.g., be respectively associated with) the respective desirable tuning settings. Associating the respective sets of conditions with the respective desirable tuning settings can facilitate efficiently determining desirable tuning settings in future instances when antenna tuning is being performed, as more fully described herein.

At 1206, association information (e.g., association, linking, or mapping information) relating to the associating of the set of conditions with the desirable tuning setting can be stored. The tuner management component can store the association information in a data store for future use. For instance, the tuner management component can update the mapping, table, or other association information based at least in part on (e.g., to incorporate) the association information relating to the association of the set of conditions with the desirable tuning setting, and can store the updated mapping, table, or other association information in the data store.

In some implementations, at this point, the method 1200 can proceed to reference point C, wherein the method 1300 can proceed from reference point C, as described herein.

Figure 13:
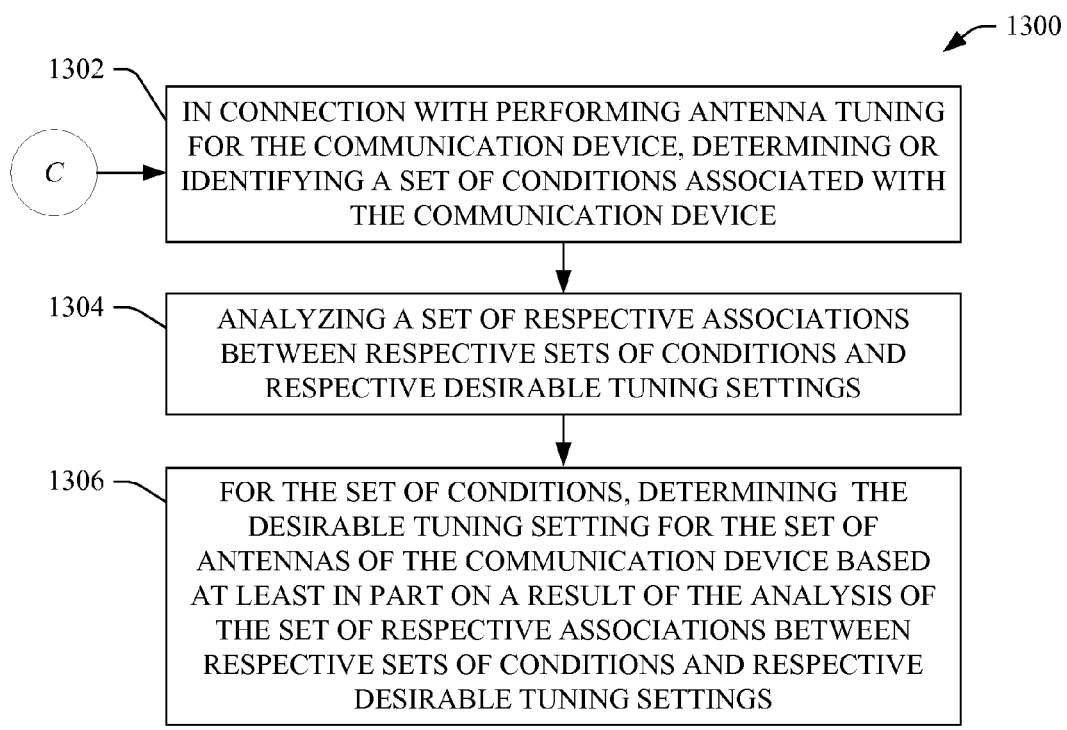
FIG. 13 presents a flow diagram of an example method for associating respective tuning settings for a set of antennas of a communication device with respective sets of conditions to facilitate efficient determinations of tuning settings for the communication device, in accordance with various aspects and embodiments of the disclosed subject matter.

FIG. 13 presents a flow diagram of an example method 1300 for associating respective tuning settings for a set of antennas of a communication device with respective sets of conditions to facilitate efficient determinations of tuning settings for the communication device, in accordance with various aspects and embodiments of the disclosed subject matter. The method 1300 can be implemented by an antenna tuning system comprising a sensor management component and a tuner management component, for example. In some implementations, the method 1300 can proceed from reference point C of the method 1200.

At 1302, in connection with performing antenna tuning for the communication device, a set of conditions can be determined or identified. The tuner management component can determine or identify the set of conditions (e.g., orientation and/or position of the communication device in relation to the user, movement of the communication device, etc.).

At 1304, a set of respective associations between respective sets of conditions and respective desirable (e.g., optimal, suitable, acceptable) tuning settings can be analyzed. The tuner management component can reference (e.g., perform a look-up, such as a table look-up) and analyze the set of respective associations between respective sets of conditions and respective desirable tuning settings.

At 1306, for the set of conditions, the desirable tuning setting for the set of antennas of the communication device can be determined based at least in part on a result of the analysis of the set of respective associations between respective sets of conditions and respective desirable tuning settings. The tuner management component can determine the desirable tuning setting for the set of antennas based at least in part on the analysis result. For example, the tuner management component can look up the set of conditions in a look-up table comprising the set of respective associations and can determine the desirable tuning setting in the look-up table that corresponds to the set of conditions. As another example, the tuner management component can analyze a mapping of the respective sets of conditions to the respective desirable tuning settings, and can determine which desirable tuning setting is mapped or linked to the set of conditions. The tuner management component can generate control information based at least in part on (e.g., corresponding to or representing) the tuning setting, and can transmit the control information to the tuner component. The tuner component can set or adjust the tuning of the set of antennas based at least in part on the control information.

Figure 14:
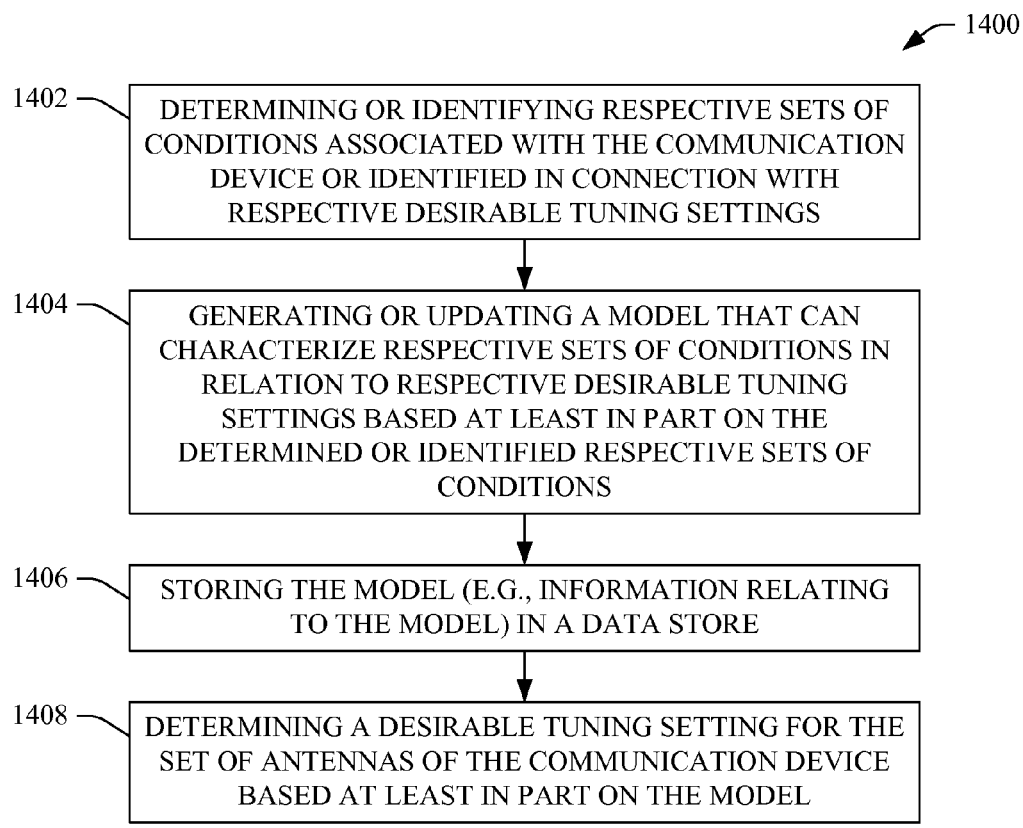
FIG. 14 illustrates a flow diagram of an example method for generating a model that characterizes the interaction of a communication device and the user in relation to tuning settings for a set of antennas of the communication device to facilitate efficient determinations of tuning settings for the communication device, in accordance with various aspects and embodiments of the disclosed subject matter.

FIG. 14 illustrates a flow diagram of an example method 1400 for generating a model that characterizes the interaction of a communication device and the user (e.g., user's body) in relation to tuning settings for a set of antennas of the communication device to facilitate efficient determinations of tuning settings for the communication device, in accordance with various aspects and embodiments of the disclosed subject matter. The method 1400 can be implemented by an antenna tuning system comprising a sensor management component and a tuner management component, for example.

At 1402, respective sets of conditions associated with the communication device can be determined or identified in connection with respective desirable tuning settings. The tuner management component or another component can determine or identify the respective sets of conditions in relation to the respective desirable (e.g., optimal, suitable, acceptable) tuning settings. A set of conditions can comprise or relate to orientation and/or position (e.g., location) of the communication device in relation to the communication device user, movement of the communication device, geographical location of the communication device, ambient temperature experienced by the communication device, a type of touching (e.g., finger(s), hand, ear, and/or face) by the user, an amount of touch pressure by the user, and/or a location of the touching by the user on the communication device (e.g., from the holding or gripping of the communication device by the user), electrical measurements relating to the signal being transmitted or received by the communication device, identity of the user, and/or other conditions.

At 1404, a model that can characterize respective sets of conditions in relation to respective desirable tuning settings can be generated or updated based at least in part on the determined or identified respective sets of conditions. The tuner management component or other component can generate or update the model based at least in part on the determined or identified respective sets of conditions in relation to the respective desirable tuning settings. For example, the tuner management component or other component can generate or update the model, wherein the model can characterize interactions between the communication device and user (e.g., user's body) to facilitate determining desirable tuning settings for the set of antennas of the communication device. The interactions can be or relate to the orientation of the communication device in relation to the user, the location of the communication device in relation to the user, the hold or grip of the user on the communication device, or other interactions between the user and communication device.

At 1406, the model (e.g., information relating to the model) can be stored in a data store. The tuner management component or other component can store the model in the data store.

At 1408, a desirable tuning setting for the set of antennas of the communication device can be determined based at least in part on the model. In connection with performing antenna tuning, the tuner management component can retrieve the model from the data store, and can analyze or apply the model with respect to current conditions, comprising conditions sensed by one or more sensor components, associated with the communication device (e.g., as determined by the tuner management component or sensor management component). The tuner management component can generate control information based at least in part on (e.g., corresponding to or representing) the determined desirable tuning setting, and can transmit the control information to the tuner component. The tuner component can set or adjust the tuning of the set of antennas based at least in part on the control information.

It is to be appreciated and understood that components (e.g., sensor management component or sensor hub component, tuner management component, tuner component, radio component, antenna, processor component, data store, etc.), as described with regard to a particular device, system, or method, can include the same or similar functionality as respective components (e.g., respectively named components or similarly named components) as described with regard to other devices, systems, or methods disclosed herein.

Although the description has been provided with respect to particular embodiments thereof, these particular embodiments are merely illustrative and not restrictive.

The articles "a," "an," and "the" as used in the subject specification and annexed drawings should generally be construed to mean "one or more" unless specified otherwise or clear from context to be directed to a singular form. Thus, as used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise. In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is to be noted that aspects, features, and/or advantages of the disclosed subject matter can be exploited in substantially any wireless telecommunication or radio technology, e.g., Wi-Fi; Bluetooth; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), Blu-Ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions, wherein the processor can directly perform operations, and/or the processor can indirectly perform operations, for example, by directing or controlling one or more other components to perform operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
   a sensor management component that receives sensor information from a set of sensor components associated with a mobile device, wherein the sensor information indicates at least one of a position or an orientation of the mobile device in relation to a user of the mobile device, and wherein the sensor management component dynamically determines a proximity of the mobile device to the user based at least in part on the sensor information; and
   a tuner management component that determines a tuning setting for a set of antennas of the mobile device, based at least in part on the proximity of the mobile device to the user, to facilitate tuning the set of antennas.

2. The system of claim 1, wherein the sensor management component or the tuner management component determines at least one of the position or the orientation of the mobile device with respect to the user based at least in part on a result of an analysis of the sensor information.

3. The system of claim 2, wherein the sensor information further comprises movement information relating to movement of the mobile device, and the sensor management component tracks the movement of the mobile device based at least in part on the movement information.

4. The system of claim 3, wherein the sensor management component determines at least one of the position of the mobile device in relation to the user, the orientation of the mobile device in relation to the user, or the movement of the mobile device, based at least in part on the result of the analysis of the sensor information, to facilitate determining the tuning setting for the set of antennas.

5. The system of claim 1, wherein the tuner management component receives electrical measurement information relating to a signal associated with a transmitter component or a receiver component of the mobile device and determines the tuning setting for the set of antennas of the mobile device, based at least in part on the electrical measurement information and the sensor information.

6. The system of claim 1, wherein the tuner management component initializes a search for the tuning setting for the set of antennas at a defined search initialization point and determines the tuning setting based at least in part a result of the search for the tuning setting, in accordance with a defined search algorithm.

7. The system of claim 6, wherein the tuner management component determines the defined search initialization point, based at least in part on the sensor information, to facilitate reducing an amount of time used to complete the search for and determine the tuning setting.

8. The system of claim 7, wherein, based at least in part on the sensor information, the tuner management component locates the defined search initialization point nearer to an end search point associated with the tuning setting than a default search initialization point to facilitate reducing the amount of time used to complete the search for and determine the tuning setting.

9. The system of claim 7, wherein a model associated with the mobile device is generated, updated, or stored in a data store, wherein the model characterizes interactions of the mobile device and a body of the user for various positions and orientations of the mobile device in relation to the body of the user, and wherein the tuner management component determines the defined search initialization point, based at least in part on analysis of the model and the sensor information, to facilitate reducing the amount of time used to complete the search for and determine the tuning setting.

10. The system of claim 9, wherein the model is generated based at least in part on a simulation relating to operation of the mobile device, a measurement relating to operation of the mobile device derived from an experiment, or adaptive training.

11. The system of claim 1, wherein the tuner management component determines a set of conditions associated with the mobile device in connection with the tuning setting for the set of antennas, associates condition information relating to the set of conditions with the tuning setting for the set of antennas, and stores the condition information and the tuning setting in a data store, wherein the set of conditions relates to at least one of the position or the orientation of the mobile device in relation to the user.

12. The system of claim 11, wherein, during operation of the mobile device, the tuner management component determines the set of conditions associated with the mobile device exists, based at least in part on additional sensor information received from the set of sensor components and relating to at least one of the position or the orientation of the mobile device in relation to the user, and determines the tuning setting based at least in part on the tuning setting being associated with the condition information relating to the set of conditions.

13. The system of claim 1, wherein the sensor information further comprises voice information relating to a voice of the user, and wherein the sensor management component identifies the user of the mobile device and generates identification information that identifies the user based at least in part on analysis of the voice information, and the tuner management component determines the tuning setting for the set of antennas based at least in part on the identification information.

14. The system of claim 1, wherein the sensor information indicates that a set of remote earphones and a remote microphone separate from the mobile phone are being used, and the tuner management component determines the tuning setting for the set of antennas in response to determining that the set of remote earphones and the remote microphone are being used.

15. The system of claim 1, wherein the sensor information indicates that a speakerphone of the mobile phone is being used, and the tuner management component determines the tuning setting for the set of antennas in response to determining that the speakerphone is being used.

16. The system of claim 1, wherein the sensor information indicates at least one of a grip on the mobile device by the user or a position of a hand of the user on the mobile device, and the tuner management component determines the tuning setting for the set of antennas in response to determining at least one of the grip on the mobile device by the user or the position of the hand of the user on the mobile device.

17. The system of claim 1, wherein the tuning setting for the set of antennas facilitates at least one of adjustment of a frequency response of the set of antennas, adjustment of a resonant frequency of the set of antennas, adjustment of an impedance of the set of antennas, or a switch from a first antenna to a second antenna, wherein the set of antennas comprises the first antenna and the second antenna.

18. The system of claim 1, wherein the set of sensor components comprises at least one of a microphone, a camera, a temperature sensor, a humidity sensor, a light sensor, an accelerometer, a gyroscope, a proximity sensor, or a touch sensor.

19. A wireless device, comprising:
a sensor hub component that receives sensor data from a set of sensor components associated with the wireless device, wherein the sensor data indicates at least one of a position or an orientation of the wireless device in relation to a user, and wherein the sensor hub component dynamically determines a proximity of the wireless device to the user based at least in part on the sensor data; and
a tuner management component that determines a tuning setting for a set of antennas of the wireless device, based at least in part on the proximity of the wireless device to the user, to facilitate tuning the set of antennas.

20. The wireless device of claim 19, wherein the tuner management component determines the tuning setting for the set of antennas in response to a determination of at least one of the position or the orientation of the wireless device in relation to the user based at least in part on the sensor data.

21. The wireless device of claim 19, wherein the sensor data further comprises movement data relating to movement of the wireless device, and the sensor hub component tracks the movement of the wireless device based at least in part on the movement data.

22. The wireless device of claim 21, wherein the tuner management component determines the tuning setting in response to a determination of at least one of the position of the wireless device in relation to the user, the orientation of the wireless device in relation to the user, or the movement of the wireless device.

23. The wireless device of claim 19, wherein the tuner management component receives electrical measurement data relating to a signal associated with a transmitter component or a receiver component of the wireless device and determines the tuning setting for the set of antennas of the wireless device, based at least in part on the electrical measurement data and the sensor data.

24. The wireless device of claim 19, wherein the tuner management component initializes a search for the tuning setting for the set of antennas at a defined search initialization point and determines the tuning setting based at least in part a result of the search for the tuning setting, in accordance with a defined search algorithm.

25. The wireless device of claim 24, wherein there is a set of search points that are respectively associated with tuning settings, and the set of search points comprises a default search initialization point, the defined search initialization point, and a convergence point that is associated with the tuning setting, and wherein the tuner management component determines the defined search initialization point and excludes a subset of the set of search points, comprising at least the default search initialization point, from the search, based at least in part on the sensor data, to facilitate reducing an amount of time used to complete the search for and determine the tuning setting.

26. The wireless device of claim 24, wherein a model associated with the wireless device is generated, wherein the model characterizes interactions of the wireless device and a body of the user for different positions and orientations of the wireless device in relation to the body of the user, and wherein the tuner management component determines at least one of the defined search initialization point or the tuning setting, based at least in part on analysis of the model and the sensor data, to facilitate reducing the amount of time used to determine the tuning setting.

27. The wireless device of claim 19, wherein the tuner management component determines a set of conditions associated with the wireless device in connection with the tuning setting for the set of antennas, links condition data relating to the set of conditions with tuner data relating to the tuning setting for the set of antennas, and stores the condition data and the tuner data in a data store, wherein the set of conditions relates to an interaction with the wireless device by the user.

28. The wireless device of claim 27, wherein, during operation of the wireless device, the tuner management component determines the set of conditions associated with the wireless device exists, based at least in part on additional sensor data received from the set of sensor components and relating to the interaction with the wireless device by the user, and determines the tuning setting based at least in part on the tuner data relating to the tuning setting being linked with the condition data relating to the set of conditions.

29. The wireless device of claim 19, wherein the sensor data further comprises at least one of voice data relating to a voice of the user, fingerprint data relating to a fingerprint of the user, or eye data relating to an eye of the user, and wherein the sensor hub component identifies the user of the wireless device and generates identification data that identifies the user based at least in part on analysis of at least one of the voice data, the fingerprint data, or the eye data, and the tuner management component determines the tuning setting for the set of antennas based at least in part on the identification data.

30. The wireless device of claim 19, wherein the sensor data indicates at least one of a grip on the wireless device by the user or a position of a hand of the user on the wireless device, and the tuner management component determines the tuning setting for the set of antennas in response to determining at least one of the grip on the wireless device by the user or the position of the hand of the user on the wireless device.

31. The wireless device of claim 19, wherein the tuning setting for the set of antennas facilitates at least one of adjustment of a frequency response of the set of antennas, adjustment of a resonant frequency of the set of antennas, adjustment of an impedance of the set of antennas, or a switch from a first antenna to a second antenna, wherein the set of antennas comprises the first antenna and the second antenna.

32. The wireless device of claim 19, wherein the set of sensor components comprises at least one of an audio capture component, an image capture component, a temperature sensor, a humidity sensor, a light sensor, an accelerometer, a gyroscope, a proximity sensor, or a touch sensor.

33. The wireless device of claim 19, further comprising:
a processor component that comprises the sensor hub component associated with the set of sensors;
a radio component that is associated with the processor component, wherein the radio component comprises the tuner management component; and
a tuner component that is associated with the radio component and the set of antennas, wherein the radio component employs the tuner management component to determine the tuning setting for the set of antennas based at least in part on at least one of the sensor data or electrical measurement data that relates to a signal of a transmitter component or a receiver component of the wireless device, in accordance with a defined antenna tuning algorithm, and wherein the tuner component sets the set of antennas in accordance with the tuning setting.

34. The wireless device of claim 19, further comprising:
a radio component that is associated with the sensor hub component that is associated with the set of sensors, wherein the radio component comprises the tuner management component; and
a tuner component that is associated with the radio component and the set of antennas, wherein the radio component employs the tuner management component to determine the tuning setting for the set of antennas based at least in part on at least one of the sensor data or electrical measurement data that relates to a signal of a transmitter component of the wireless device, in accordance with a defined antenna tuning algorithm, and wherein the tuner component sets the set of antennas in accordance with the tuning setting.

35. The wireless device of claim 19, further comprising:
a radio component that is associated with the sensor hub component that is associated with the set of sensors, wherein the sensor hub component comprises the tuner management component; and
a tuner component that is associated with the sensor hub component, the radio component, and the set of antennas,
wherein the radio component performs electrical measurements relating to a signal of a transmitter component or a receiver component of the wireless device and provides electrical measurement data relating to the electrical measurements to the sensor hub component,
wherein the sensor hub component employs the tuner management component to determine the tuning setting for the set of antennas based at least in part on at least one of the sensor data or the electrical measurement data, in accordance with a defined antenna tuning algorithm, and
wherein the tuner component sets the set of antennas in accordance with the tuning setting.

* * * * *